United States Patent
Yoshihara et al.

(10) Patent No.: US 11,207,603 B2
(45) Date of Patent: Dec. 28, 2021

(54) INFORMATION PROCESSING SYSTEM AND INFORMATION PROCESSING APPARATUS THAT ALLOW DIVERSIFIED GAME DEVELOPMENT, METHOD OF CONTROLLING INFORMATION PROCESSING SYSTEM, AND INFORMATION PROCESSING PROGRAM IN PUZZLE GAME USING DEFENSIVE AND OFFENSIVE PARAMATERS

(71) Applicant: NINTENDO CO., LTD., Kyoto (JP)

(72) Inventors: Kazuki Yoshihara, Kyoto (JP); Soojin Lee, Seongnam-si (KR); Taehoon Jun, Seongnam-si (KR); Taewoo Kim, Seongnam-si (KR)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/892,873

(22) Filed: Jun. 4, 2020

(65) Prior Publication Data
US 2020/0391120 A1 Dec. 17, 2020

(30) Foreign Application Priority Data

Jun. 13, 2019 (JP) .............................. JP2019-110571
May 12, 2020 (JP) .............................. JP2020-083746

(51) Int. Cl.
*A63F 13/822* (2014.01)
*A63F 13/537* (2014.01)
*A63F 13/843* (2014.01)

(52) U.S. Cl.
CPC .......... *A63F 13/822* (2014.09); *A63F 13/537* (2014.09); *A63F 13/843* (2014.09)

(58) Field of Classification Search
CPC ..... A63F 13/537; A63F 13/822; A63F 13/843
See application file for complete search history.

(56) References Cited

U.S. PATENT DOCUMENTS

| | | | |
|---|---|---|---|
| 4,763,898 A * | 8/1988 | Hemmann | A63F 9/00 273/153 R |
| 5,265,888 A | 11/1993 | Yamamoto et al. | |
| 6,340,159 B1 * | 1/2002 | Giangrante | A63F 3/0423 273/272 |
| 6,938,899 B2 * | 9/2005 | Kenney | A63F 3/00075 273/146 |
| 7,469,901 B1 * | 12/2008 | Hilliard | A63F 1/02 273/308 |

(Continued)

FOREIGN PATENT DOCUMENTS

JP    4-54986    2/1992

*Primary Examiner* — Steve Rowland
(74) *Attorney, Agent, or Firm* — Nixon & Vanderhye, P.C.

(57) ABSTRACT

An information processing system that performs puzzle game processing for a puzzle game played against each other by a plurality of users includes designating a game element with which first and second parameters are associated for each of a plurality of users, performing puzzle game processing based on an operation by each user onto a puzzle object arranged in a game field, and executing, when a status of progress of the puzzle game processing for one of the plurality of users satisfies an offense condition while the puzzle game processing is being performed, an offense event that produces an effect of interference in the game field in the puzzle game processing for the other user.

32 Claims, 23 Drawing Sheets

(56) References Cited

U.S. PATENT DOCUMENTS

| | | | |
|---|---|---|---|
| 7,677,570 B2* | 3/2010 | Hohenstein | A63F 3/02 273/271 |
| 10,600,335 B1* | 3/2020 | Donovan | G09B 19/0053 |
| 2003/0040350 A1* | 2/2003 | Nakata | A63F 13/10 463/9 |
| 2003/0064807 A1* | 4/2003 | Walker | G07F 17/3237 463/42 |
| 2003/0139210 A1* | 7/2003 | Raben | A63F 9/0098 463/9 |
| 2006/0022407 A1* | 2/2006 | Jensen | A63F 3/04 273/272 |
| 2012/0289324 A1* | 11/2012 | Bancel | G07F 17/3276 463/26 |
| 2013/0175759 A1* | 7/2013 | Shenoy | A63F 3/0423 273/272 |
| 2017/0197150 A1* | 7/2017 | Nuell | A63F 13/822 |
| 2018/0085659 A1* | 3/2018 | Wilk | A63F 3/0421 |

\* cited by examiner

INFORMATION PROCESSING SYSTEM AND INFORMATION PROCESSING APPARATUS THAT ALLOW DIVERSIFIED GAME DEVELOPMENT, METHOD OF CONTROLLING INFORMATION PROCESSING SYSTEM, AND INFORMATION PROCESSING PROGRAM IN PUZZLE GAME USING DEFENSIVE AND OFFENSIVE PARAMATERS

This nonprovisional application is based on Japanese Patent Applications Nos. 2019-110571 and 2020-083746 filed with the Japan Patent Office on Jun. 13, 2019 and May 12, 2020, respectively, the entire contents of which are hereby incorporated by reference.

FIELD

The present disclosure relates to an information processing system and particularly to an information processing system that performs puzzle game processing.

BACKGROUND AND SUMMARY

"Dr. Mario" game has conventionally been available as one of puzzle games played while a plurality of types of objects fall. This game proceeds in such a manner that, when a prescribed number of capsules and/or viruses identical in type that represent exemplary objects are concatenated, objects in a prescribed concatenated state are eliminated while a capsule located thereabove is allowed to fall.

In a conventional puzzle game, a status of a game is varied only by game skills of a user and hence there is a room for improvement in diversity of game development.

The present disclosure was made to solve a problem as above and an object thereof is to provide an information processing system and an information processing apparatus that allow diversified game development, a method of controlling an information processing system, and an information processing program.

An information processing system according to one aspect performs puzzle game processing for a puzzle game played against each other by a plurality of users, and the information processing system includes designating a game element with which first and second parameters are associated for each of the plurality of users, performing the puzzle game processing based on an operation by each of the plurality of users onto a puzzle object arranged in a game field, and executing, when a status of progress of the puzzle game processing for one user of the plurality of users satisfies an offense condition while the puzzle game processing is being performed, an offense event that produces an effect of interference with progress of the puzzle game processing in a game field in the puzzle game processing for an opponent of the one user of the plurality of users. During execution of the offense event, a degree of interference is determined based on a first parameter associated with the game element designated for the one user, and during execution of the offense event, the determined degree of interference is lessened based on a second parameter associated with the game element designated for the opponent.

A game element with which first and second parameters are associated can be designated, a degree of interference with progress of puzzle game processing can be determined based on the first parameter, and the degree of interference with progress of the puzzle game processing can be lessened based on the second parameter. A status of a game is not varied only by game skills of a user but game development can be diversified.

In an exemplary embodiment, the designating a game element may include designating the game element with which the first parameter and a plurality of second parameters are associated.

Lessening of interference with progress of puzzle game processing can be determined based on a plurality of second parameters. A status of a game is not varied only by game skills of a user but game development can be more diversified.

In an exemplary embodiment, the executing an offense event may include lessening the determined degree of interference based on a second parameter corresponding to the first parameter among the plurality of second parameters associated with the game element designated for the opponent.

A degree of interference with progress of puzzle game processing can be lessened based on a second parameter corresponding to the first parameter among the plurality of second parameters. A status of a game is not varied only by game skills of a user but game development can be more diversified.

In an exemplary embodiment, the second parameter may be a probability with which interference with progress of the puzzle game processing is lessened.

Lessening of interference with progress of puzzle game processing can be determined based on a probability with which interference with progress of puzzle game processing is lessened. A status of a game is not varied only by game skills of a user but game development can be more diversified.

In an exemplary embodiment, the information processing system may further include providing each of the users with at least one game element of a plurality of game elements based on a draw. The designating a game element may include designating, in accordance with an operation by the user, at least one game element provided to each user by providing the game element based on the draw.

A game element is provided based on a draw. With unexpectedness being enhanced, zest of game processing can be enhanced.

In an exemplary embodiment, one set of specific first and second parameters may be set for each of a plurality of game elements.

In an exemplary embodiment, a combination pattern of the first and second parameters associated with each game element among the plurality of game elements may be different for each game element.

Since a combination pattern of the first and second parameters associated with each game element is different, game development can be more diversified.

In an exemplary embodiment, the information processing system may further include determining whether or not the status of progress of the puzzle game processing satisfies the offense condition. The offense condition may be different depending on the first parameter associated with the game element.

In an exemplary embodiment, the offense condition may be set to be satisfied more readily or less readily as the first parameter is larger.

An offense condition is varied depending on the first parameter associated with the game element. Therefore, a status of a game is not varied only by game skills of a user but game development can be more diversified.

In an exemplary embodiment, the performing the puzzle game processing may include performing the puzzle game processing for eliminating a puzzle object arranged in the game field, based on an operation by each user onto the puzzle object. The executing an offense event may include determining, based on the first parameter associated with the game element designated for one user, the number of puzzle objects to additionally be arranged in the game field in the puzzle game processing for the opponent.

Since the number of puzzle objects to additionally be arranged is determined based on the first parameter, game development can be more diversified.

In an exemplary embodiment, the information processing system may further include determining whether or not the status of progress of the puzzle game processing satisfies the offense condition. The determining whether or not the status of progress of the puzzle game processing satisfies the offense condition may include determining whether or not the offense condition is satisfied based on points in accordance with the number of eliminated puzzle objects which represent the status of progress of the puzzle game processing for one of the plurality of users while the puzzle game processing is being performed.

Whether or not the offense condition is satisfied is determined based on whether or not points in accordance with the number of eliminated puzzle objects are equal to or more than prescribed points. Therefore, a status of a game is not varied only by game skills of a user but game development can be more diversified.

In an exemplary embodiment, the information processing system may further include quitting the puzzle game processing when the puzzle object arranged in the game field in the puzzle game processing crosses one line within the game field.

By providing quitting the puzzle game processing when one line is crossed, end of game processing can be expected and zest can be enhanced.

An information processing apparatus according to one aspect performs puzzle game processing for a puzzle game played against another communicatively provided information processing apparatus, and the information processing apparatus includes designating a game element with which first and second parameters are associated, performing the puzzle game processing based on an operation by a user onto a puzzle object arranged in a game field, and outputting, when a status of progress of the puzzle game processing satisfies an offense condition while the puzzle game processing is being performed, the first parameter to another information processing apparatus for executing an offense event that produces an effect of interference with progress of the puzzle game processing in the game field in the puzzle game processing for an opponent. During execution of the offense event, when the offense event is accepted from another information processing apparatus while the puzzle game processing is being performed, a degree of interference with progress is determined based on the first parameter from another information processing apparatus in the game field in the puzzle game processing, and during execution of the offense event, the determined degree of interference is lessened based on the second parameter associated with the designated game element.

A game element with which first and second parameters are associated can be determined, a degree of interference with progress of puzzle game processing can be determined based on the first parameter, and the degree of interference with progress of the puzzle game processing can be lessened based on the second parameter. A status of a game is not varied only by game skills of a user but game development can be diversified.

A method of controlling an information processing system that performs puzzle game processing for a puzzle game played against each other by a plurality of users according to one aspect includes designating a game element with which first and second parameters are associated for each of the plurality of users, performing the puzzle game processing based on an operation by each of the plurality of users onto a puzzle object arranged in a game field, and executing, when a status of progress of the puzzle game processing for one user of the plurality of users satisfies an offense condition while the puzzle game processing is being performed, an offense event that produces an effect of interference with progress of the puzzle game processing in a game field in the puzzle game processing for an opponent of the one user of the plurality of users. The executing an offense event includes determining a degree of interference based on a first parameter associated with the game element designated for the one user and lessening the determined degree of interference based on a second parameter associated with a game element designated for the opponent.

A game element with which first and second parameters are associated can be determined, a degree of interference with progress of puzzle game processing can be determined based on the first parameter, and the degree of interference with progress of the puzzle game processing can be lessened based on the second parameter. A status of a game is not varied only by game skills of a user but game development can be diversified.

According to one aspect, a non-transitory storage medium that stores an information processing program readable by a computer of an information processing apparatus that performs puzzle game processing for a puzzle game played against another communicatively provided information processing apparatus is provided, and the information processing program causes the computer to perform processing including designating a game element with which first and second parameters are associated, performing the puzzle game processing based on an operation by a user onto a puzzle object arranged in a game field, outputting, when a status of progress of the puzzle game processing satisfies an offense condition while the puzzle game processing is being performed, the first parameter to another information processing apparatus for executing an offense event that produces an effect of interference with progress of the puzzle game processing in a game field in the puzzle game processing for an opponent, determining, during execution of the offense event, when the offense event is accepted from another information processing apparatus while the puzzle game processing is being performed, a degree of interference with progress based on the first parameter from another information processing apparatus in the game field in the puzzle game processing, and lessening, during execution of the offense event, the determined degree of interference based on the second parameter associated with the designated game element.

A game element with which first and second parameters are associated can be determined, a degree of interference with progress of puzzle game processing can be determined based on the first parameter, and the degree of interference with progress of the puzzle game processing can be lessened based on the second parameter. A status of a game is not varied only by game skills of a user but game development can be diversified.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
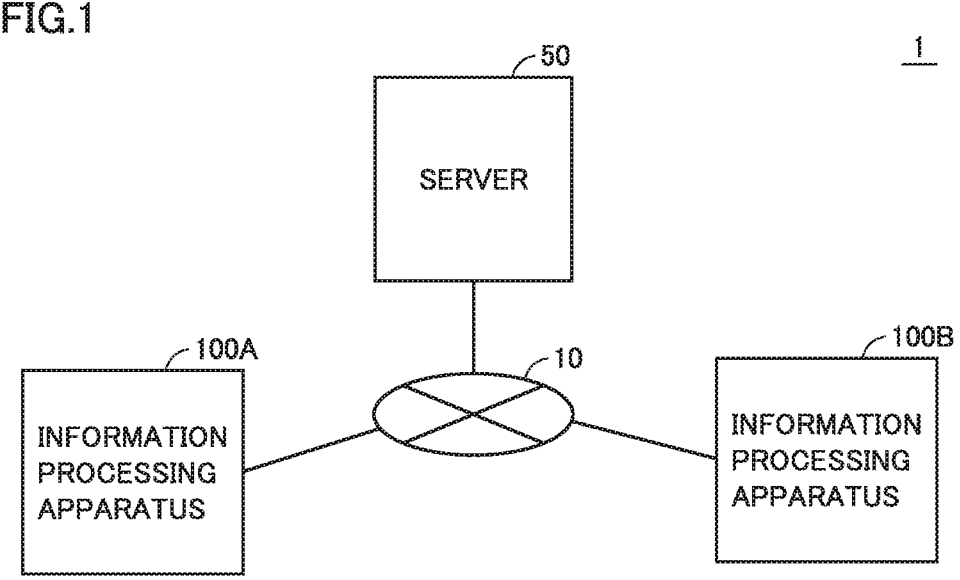
FIG. 1 shows an exemplary illustrative non-limiting diagram of an exemplary non-limiting configuration of an information processing system 1 according to an exemplary embodiment.

The present embodiment will be described in detail with reference to the drawings. The same or corresponding elements in the drawings have the same reference characters allotted and description thereof will not be repeated.

[A. Overall Configuration of System]

[a1. Configuration of Information Processing System]

FIG. 1 is a diagram illustrating a configuration of an information processing system 1 based on an embodiment.

As shown in FIG. 1, information processing system 1 includes a plurality of information processing apparatuses 100A and 100B, a network 10, and a server 50.

The plurality of information processing apparatuses 100A and 100B (which are also collectively referred to as an information processing apparatus 100) and server 50 are communicatively connected to one another through network 10.

Server 50 sets combination for communication connection among the plurality of information processing apparatuses 100A and 100B. Data communication processing is performed between at least two information processing apparatuses of the plurality of information processing apparatuses 100A and 100B in accordance with a setting instruction from server 50.

[a2. Hardware Configuration of Information Processing Apparatus]

Figure 2:
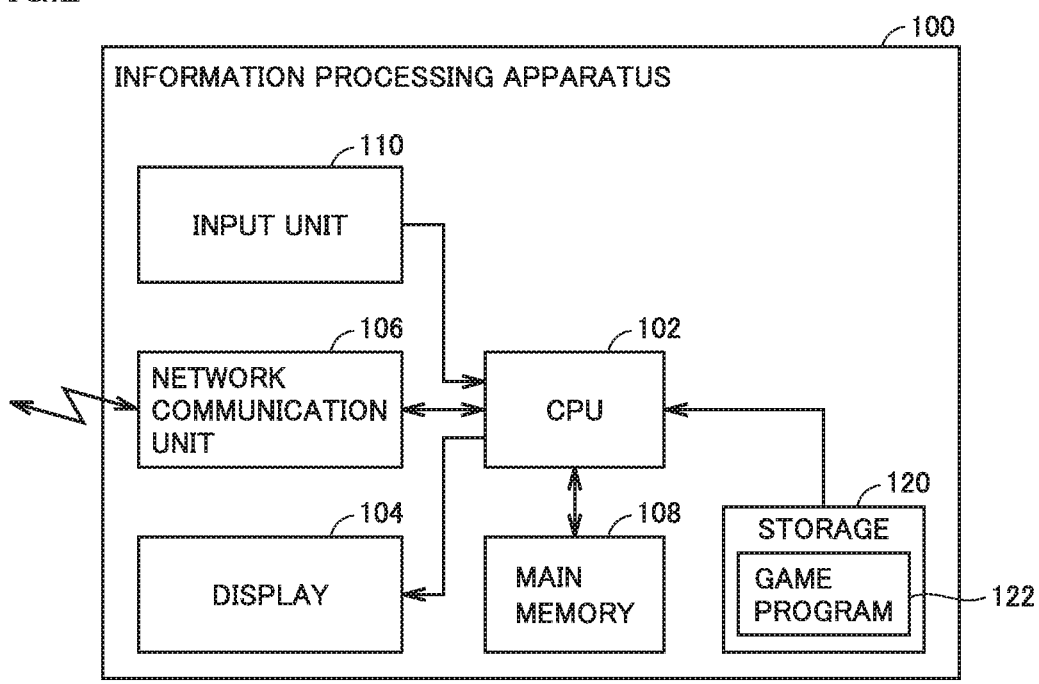
FIG. 2 shows an exemplary illustrative non-limiting diagram illustrating an exemplary non-limiting hardware configuration of an information processing apparatus 100 according to an exemplary embodiment.

FIG. 2 is a diagram illustrating a hardware configuration of information processing apparatus 100 based on the embodiment. By way of example, a configuration where the information processing apparatus according to the embodiment is mounted as a game device will be described.

As shown in FIG. 2, information processing apparatus 100 may be any computer. Information processing apparatus 100 may be, for example, a portable (also referred to as mobile) device such as a portable game device, a portable telephone, or a smartphone, a stationary apparatus such as a personal computer or a home game console, or a large apparatus such as an arcade game machine for a commercial purpose.

The hardware configuration of information processing apparatus 100 is outlined below.

Information processing apparatus 100 includes a CPU 102 and a main memory 108. CPU 102 is an information processor that performs various types of information processing in information processing apparatus 100. CPU 102 performs the various types of information processing by using main memory 108.

Information processing apparatus 100 includes a storage 120. Storage 120 stores various programs (which may include not only a game program 122 but also an operating system) executed in information processing apparatus 100. Any storage (storage medium) accessible by CPU 120 is adopted as storage 120. For example, a storage embedded in information processing apparatus 100 such as a hard disk or a memory, a storage medium attachable to and removable from information processing apparatus 100 such as an optical disc or a cartridge, or combination of a storage and a storage medium as such may be adopted as storage 120. In such a case, a game system representing an exemplary information processing system including information processing apparatus 100 and any storage medium may be configured.

Game program 122 includes computer-readable instructions for performing game processing as will be described later. The game program also includes a program that establishes data communication with server 50 and a program that establishes data communication with another information processing apparatus as a part of game processing.

Information processing apparatus 100 includes an input unit 110 that accepts an instruction from a user, such as a button or a touch panel. Information processing apparatus 100 includes a display 104 that shows an image generated through information processing.

Information processing apparatus 100 includes a network communication unit 106. Network communication unit 106 is connected to network 10 and performs processing for data communication with an external apparatus (for example, server 50 or another information processing apparatus 100).

Information processing apparatus 100 may be implemented by a plurality of apparatuses. For example, information processing apparatus 100 may be implemented by a main body apparatus including CPU 102 and an apparatus including input unit 110 and/or display 104, which are separate from each other. For example, in another embodiment, information processing apparatus 100 may be implemented by a main body apparatus and a terminal device including input unit 110 and display 104, or by a main body apparatus and an operation apparatus including input unit 110. Information processing apparatus 100 may employ a television as a display apparatus, without including display 104.

In another embodiment, at least some of information processing performed in information processing apparatus 100 may be performed as being distributed among a plurality of apparatuses that can communicate over network 10 (a wide area network and/or a local network).

[a.3. Hardware Configuration of Server]

Figure 3:
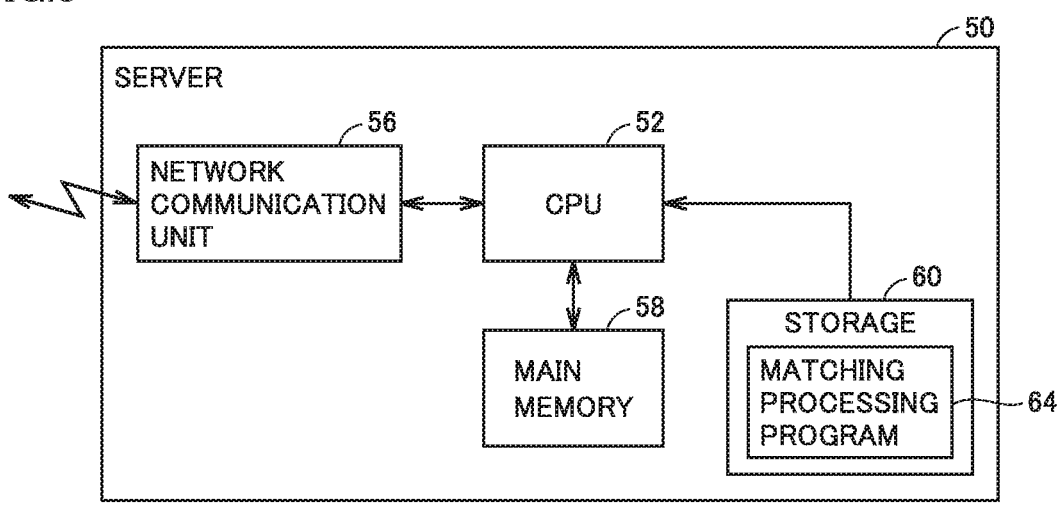
FIG. 3 shows an exemplary illustrative non-limiting diagram illustrating an exemplary non-limiting hardware configuration of a server 50 according to an exemplary embodiment.

FIG. 3 is a diagram illustrating a hardware configuration of server 50 based on the embodiment. Server 50 sets combination for communication connection among a plurality of information processing apparatuses 100 and transmits a result of processing to information processing apparatus 100.

As shown in FIG. 3, server 50 includes a CPU 52 and a main memory 58. CPU 52 is an information processor that performs various types of information processing in server 50. CPU 52 performs the various types of information processing by using main memory 58.

Server 50 includes a storage 60. Storage 60 stores various programs (which may include not only a matching processing program 64 for performing matching processing which will be described later but also an operating system and a communication program) executed in server 50. Any storage (storage medium) accessible by CPU 52 is adopted as storage 60. For example, a storage embedded in server 50 such as a hard disk or a memory, a storage medium attachable to and removable from server 50 such as an optical disc or a cartridge, or combination of a storage and a storage medium as such may be adopted as storage 60.

Server 50 includes a network communication unit 56. Network communication unit 56 is connected to network 10 and performs processing for data communication with an external apparatus (another information processing apparatus 100).

Server 50 may be constituted of a plurality of apparatuses. For example, server 50 may be configured such that an apparatus including network communication unit 56 is removably connected to an apparatus including CPU 52 and main memory 58.

[B. Overview of Game Processing]

Game processing provided by execution of game program 122 according to the embodiment will be outlined below.

Game program 122 according to the embodiment provides a kind of a play-against-type puzzle game in which a plurality of users can participate. The plurality of users may include one real user and a virtual user provided on a computer. The plurality of users are not limited to two users but may be three or more users, or a plurality of users may make up one team and teams may play against each other.

More specifically, in a puzzle game provided by game program 122, a plurality of users play against each other by operating a puzzle object in each game field. The puzzle game proceeds in such a manner that puzzle objects are eliminated by combining puzzle objects based on a prescribed rule, and when a predetermined condition is satisfied, a player that satisfies the condition wins the game.

[C. Exemplary Screen Representation in Game Processing]

Exemplary screen representation and an exemplary operation in game processing provided by execution of game program 122 according to the embodiment will now be described. By way of example, exemplary screen representation is provided on display 104 of information processing apparatus 100A.

Figure 4:
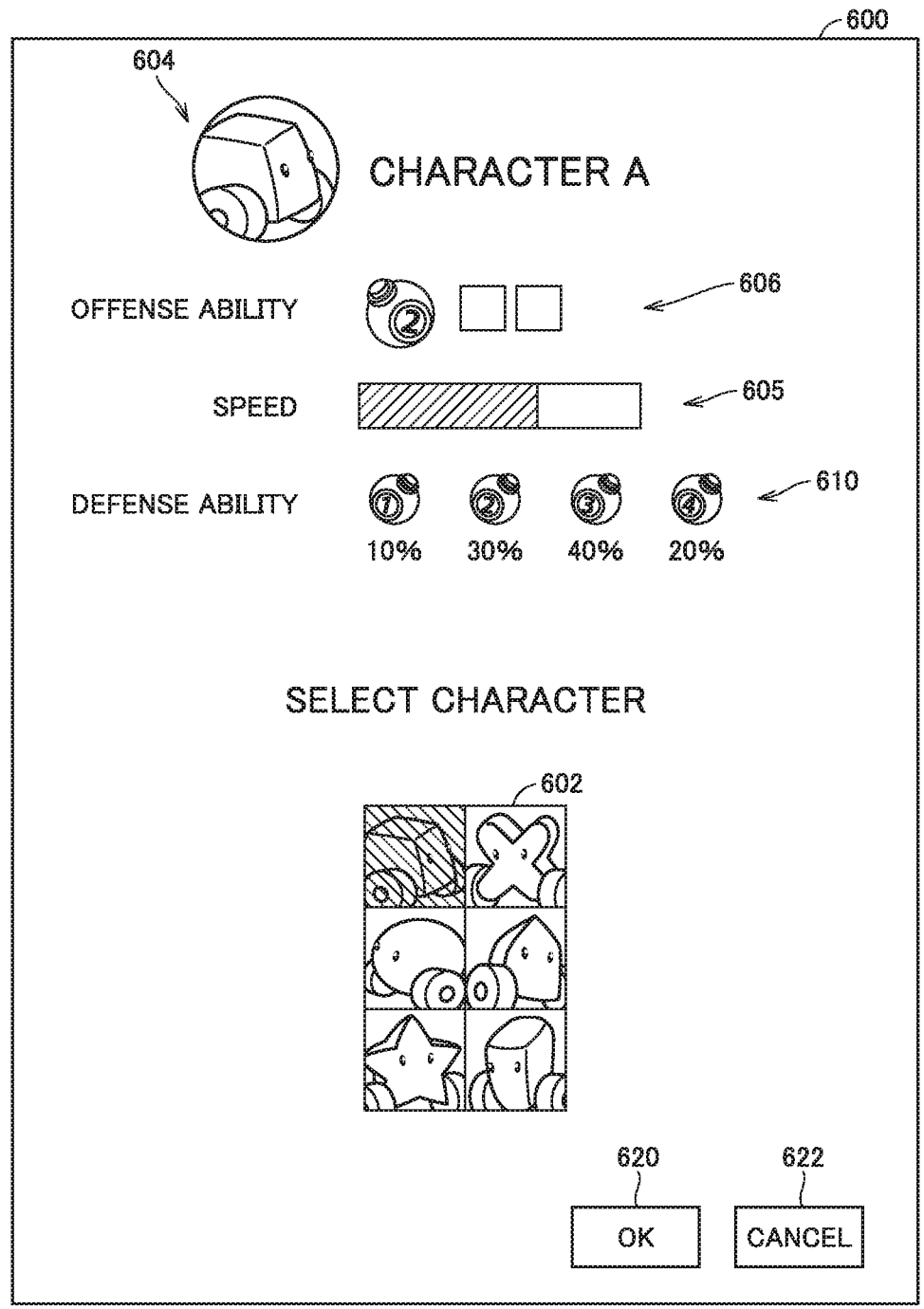
FIG. 4 shows an exemplary illustrative non-limiting diagram illustrating an exemplary non-limiting selection acceptance screen 600 for accepting selection of a user character to be used by a user in game processing provided by a game program 122 according to an exemplary embodiment.

FIG. 4 is a diagram illustrating a selection acceptance screen 600 for accepting selection of a user character to be used by a user in game processing provided by game program 122 based on the embodiment.

As shown in FIG. 4, in selection acceptance screen 600, a user character list 602, a user character 604 selected from user character list 602, and an "offense ability" item 606, a "speed" item 608, and a "defense ability" item 610 of the user character are shown.

In user character list 602, a plurality of selectable characters are provided. In the present example, six selectable characters are provided by way of example. The characters are provided to be different in characteristic (parameter) from one another. In the present example, three parameters of "offense ability," a "speed", and "defense ability" as characteristics are allocated for each character.

The "offense ability" parameter is used in executing an offense event that produces an effect of interference in a game field in puzzle game processing for an opponent. Specifically, a degree of interference with progress of puzzle game processing for the opponent is determined by the "offense ability" parameter. By way of example, a numeric value "2" of the "offense ability" parameter is shown. This numeric value means addition in the offense event, of two rows of puzzle objects as interference with progress in the game field in puzzle game processing for the opponent. By way of example, when a numeric value "1" is set as the "offense ability" parameter, one row of puzzle object is added as interference with progress in the game field in puzzle game processing for the opponent. When a numeric value "3" is set as the "offense ability" parameter, three rows of puzzle objects are added as interference with progress in the game field in puzzle game processing for the opponent. When a numeric value "4" is set as the "offense ability" parameter, four rows of puzzle objects are added as interference with progress in the game field in puzzle game processing for the opponent.

The "speed" parameter represents likeliness of generation of an offense event. As the "speed" parameter is larger, generation of an offense event is more likely, and as the parameter is smaller, generation of an offense event is less likely. In puzzle game processing, a point is provided and added as a result of elimination of puzzle objects, and as prescribed points are amassed, an offense event is generated. For example, when a numeric value of the "offense ability" parameter is large, the "speed" parameter may be set to be smaller than when the numeric value of the "offense ability" parameter is small. Each character can thus express individuality based on a parameter and game development can be varied in a diversified manner.

The "defense ability" parameter is used when one experiences an offense event from an opponent. Specifically, lessening of interference with progress of puzzle game processing by an opponent is determined based on the "defense ability" parameter corresponding to the "offense ability" parameter. By way of example, four numeric values of the "defense ability" parameter are shown in correspondence with numeric values "1" to "4" of the "offense ability" parameter, respectively. The "defense ability" parameter corresponding to the numeric value "1" of the "offense ability" parameter is "10%". The "defense ability" parameter corresponding to the numeric value "2" of the "offense ability" parameter is "30%". The "defense ability" parameter corresponding to the numeric value "3" of the "offense ability" parameter is "40%". The "defense ability" parameter corresponding to the numeric value "4" of the "offense ability" parameter is "20%". The numeric value of the "defense ability" parameter represents a probability with which interference by the offense event from the opponent can be avoided. As the probability is higher, interference by the offense event can be avoided. In the present example, though four numeric values of the "defense ability" parameter are provided in correspondence with the numeric values "1" to "4" of the "offense ability" parameter, respectively by way of example, a single "defense ability" parameter can also be set.

In selection acceptance screen 600, an "OK" button 620 and a "cancel" button 622 are provided.

By selecting "OK" button 620, game processing based on a selected user character proceeds.

In the present example, information on the selected user character is transmitted to server 50.

Server 50 receives the information transmitted from information processing apparatus 100, sets combination for communication connection among a plurality of information processing apparatuses 100, and transmits a result of processing to information processing apparatus 100.

Figure 5:
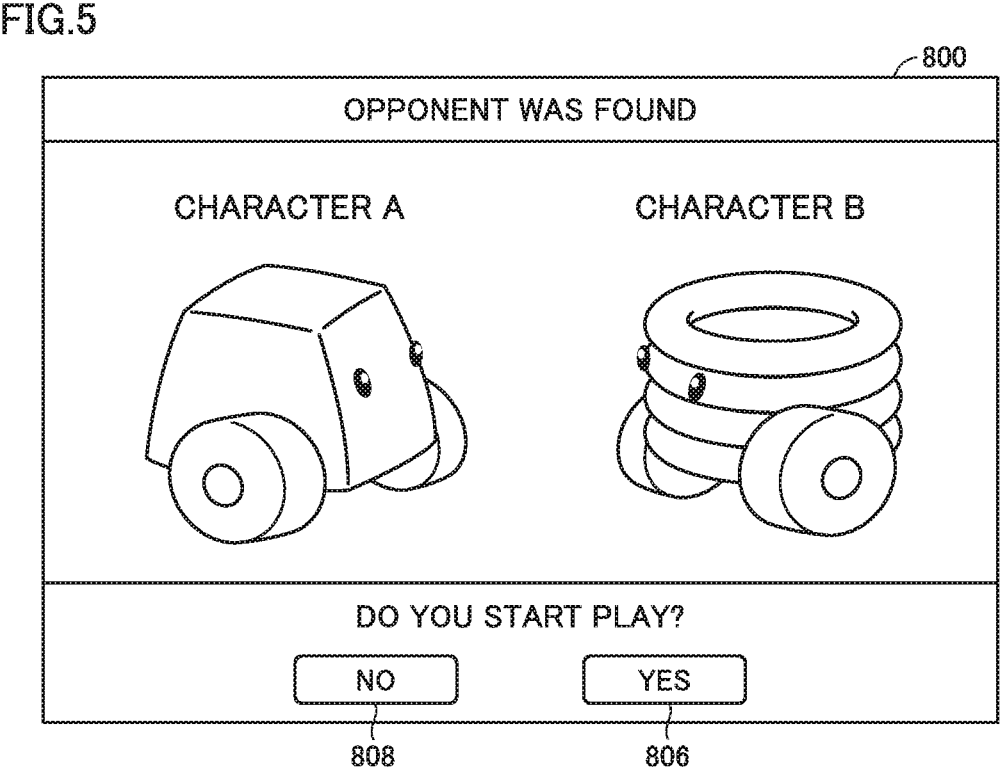
FIG. 5 shows an exemplary illustrative non-limiting diagram illustrating an exemplary non-limiting game execution confirmation screen in game processing provided by game program 122 according to an exemplary embodiment.

FIG. 5 is a diagram illustrating a game execution confirmation screen in game processing provided by game program 122 based on the embodiment.

As shown in FIG. 5, in an execution confirmation screen 800, information on an opponent is shown based on a result of processing transmitted from server 50.

In the present example, in execution confirmation screen 800, a "character B" in another information processing apparatus (for example, information processing apparatus 100B) as an opponent is shown based on the information transmitted from server 50.

A message "do you start play?" is also shown.

A "NO" button 808 and a "YES" button 806 are provided. By performing an operation to select "YES" button 806 through input unit 110, game processing of a play-against-type puzzle game is started. By performing an operation to select "NO" button 808 through input unit 110, the process ends. Alternatively, representation may return to an immediately preceding screen.

Though execution confirmation screen 800 is shown before performing game processing in the present example, limitation thereto is not particularly intended. Game processing may start without showing the execution confirmation screen after combination for communication connection is set.

Load imposed on a user by memorization of compatibility among characters can thus be prevented.

Figure 6:
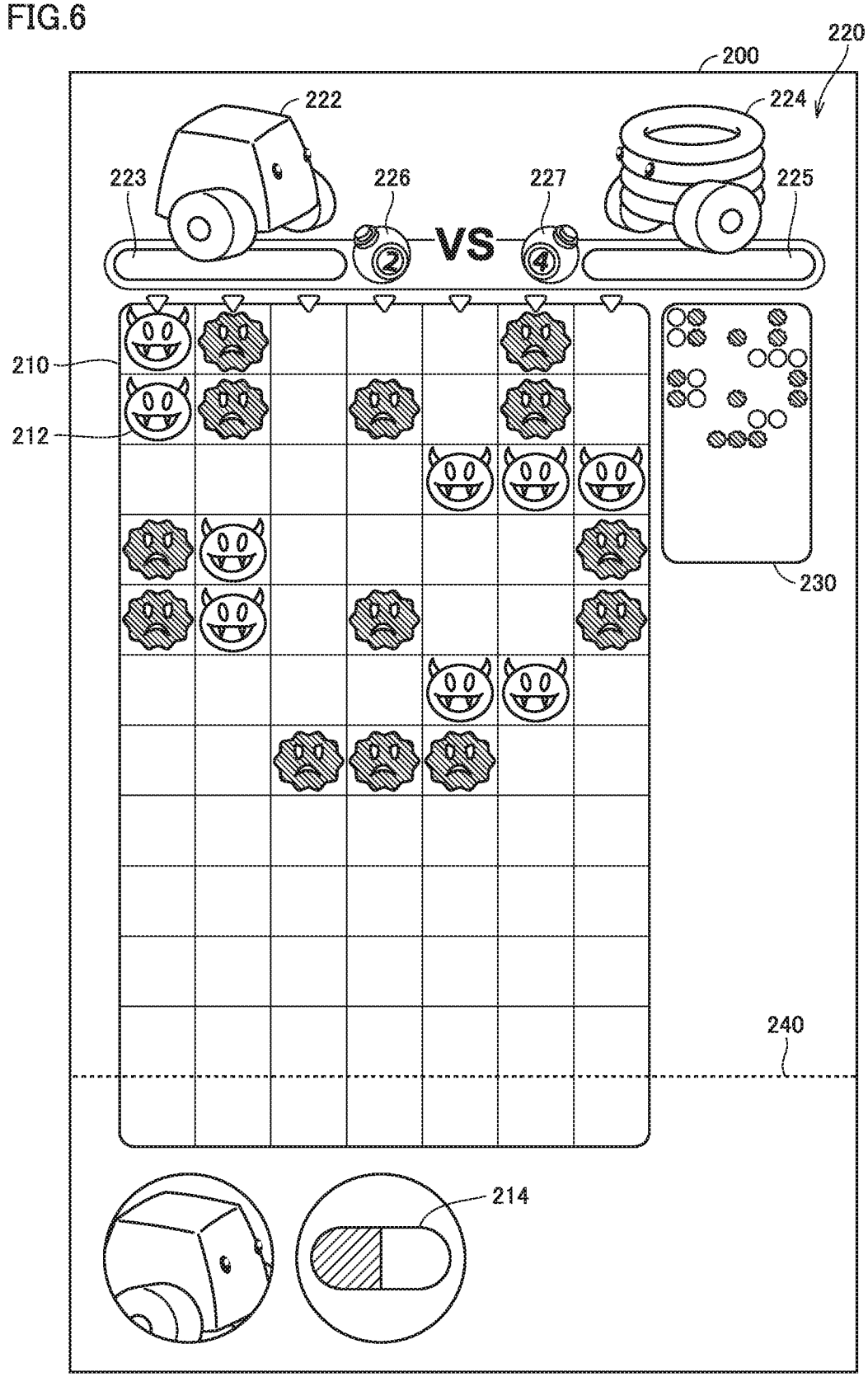
FIG. 6 shows an exemplary illustrative non-limiting diagram illustrating an exemplary non-limiting screen 200 during play of a puzzle game in game processing provided by game program 122 according to an exemplary embodiment.

FIG. 6 is a diagram illustrating a screen 200 during play of a puzzle game in game processing provided by game program 122 based on the embodiment.

As shown in FIG. 6, in screen 200, a game field 210 where a puzzle object is arranged and a character play field 220 on game field 210 are provided. In character play field 220, characters that play against each other are arranged. On the right of game field 210, a display field 230 that shows a status of the game field on an opponent side is provided.

In character play field 220, character objects 222 and 224 that play against each other are arranged. By way of example, a character A and character B play against each other.

Offense gauges 223 and 225 are arranged in correspondence with character objects 222 and 224, respectively. When offense gauge 223 or 225 is filled up, an offense event is generated.

A numeric value of the "offense ability" parameter is shown in correspondence with each of character objects 222 and 224. By way of example, a numeric value "2" of the "offense ability" parameter of character A and a numeric value "4" of the "offense ability" parameter of character B are shown.

In the present example, two types of puzzle objects (first and second puzzle objects 212 and 214) are provided in game field 210.

First puzzle object 212 is in a shape, for example, like a virus. Second puzzle object 214 is in a shape, for example, like a capsule.

First puzzle object 212 is automatically shown regardless of an operation by a user, and a prescribed number of tiers and/or a prescribed number of puzzle objects are set at the time of start of a game.

A type of the capsule or the virus is expressed by a color or a density. For example, the type of the capsule or the virus may be specified or identified, for example, by three colors of red, yellow, and blue, or three density levels of white, gray, and black.

The capsule may be divided into two halves, and the two halves may be identical to or different from each other in type.

The capsule is moved or a state of representation thereof is varied by an operation onto input unit 110 by a user. For example, each time input unit 110 is operated to touch the capsule, the capsule rotates by 90° clockwise.

FIGS. 7A to 7D are diagrams illustrating states of rotation of the capsule based on the embodiment.

As shown in FIGS. 7A to 7D, each time input unit 110 is operated to touch the second puzzle object (capsule), the second puzzle object is rotated.

Figure 7A:
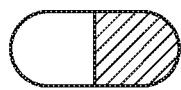
FIGS. 7A to 7D show exemplary illustrative non-limiting diagrams illustrating exemplary non-limiting states of rotation of a capsule according to an exemplary embodiment.
Figure 7B:
Figure 7C:
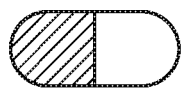
Figure 7D:
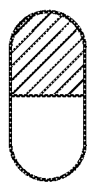

For example, with a state in FIG. 7A being defined as the reference, when the user touches the second puzzle object (capsule), the second puzzle object (capsule) is rotated by 90 degrees as shown in FIG. 7B. When the user further touches the capsule, the capsule is rotated by 90 degrees as shown in FIG. 7C. When the user further touches the capsule, the capsule is rotated by 90 degrees as shown in FIG. 7D.

Referring again to FIG. 6, the second puzzle object (capsule) in the embodiment appears in a central portion at a lower end of the game field and thereafter moves upward at a constant speed. When the second puzzle object (capsule) hits the upper end of the game field or any first or second puzzle object (the capsule or the virus) and is no longer movable or rotatable, it is fixed at that position.

The user can operate the second puzzle object (capsule) while the second puzzle object (capsule) moves upward.

By operating input unit 110 to slide the capsule to the right or left in the game field while the user keeps touching the capsule, the user can also move the capsule.

In the present example, when a prescribed number (for example, at least three in a vertical direction or a horizontal direction) of first puzzle objects (viruses) and/or second puzzle objects (capsules) identical in type (color or density) are concatenated, the puzzle objects in a prescribed concatenated state are eliminated. The game proceeds while the capsule is moved upward at a constant speed.

When a puzzle object crosses a limit line 240 shown in a lower portion in game field 210, the game is over.

When at least three puzzle objects identical in color are aligned in the vertical direction or the horizontal direction in game field 210, these puzzle objects are eliminated from the screen and a point is added in accordance with the number of eliminated puzzle objects.

Figure 8:
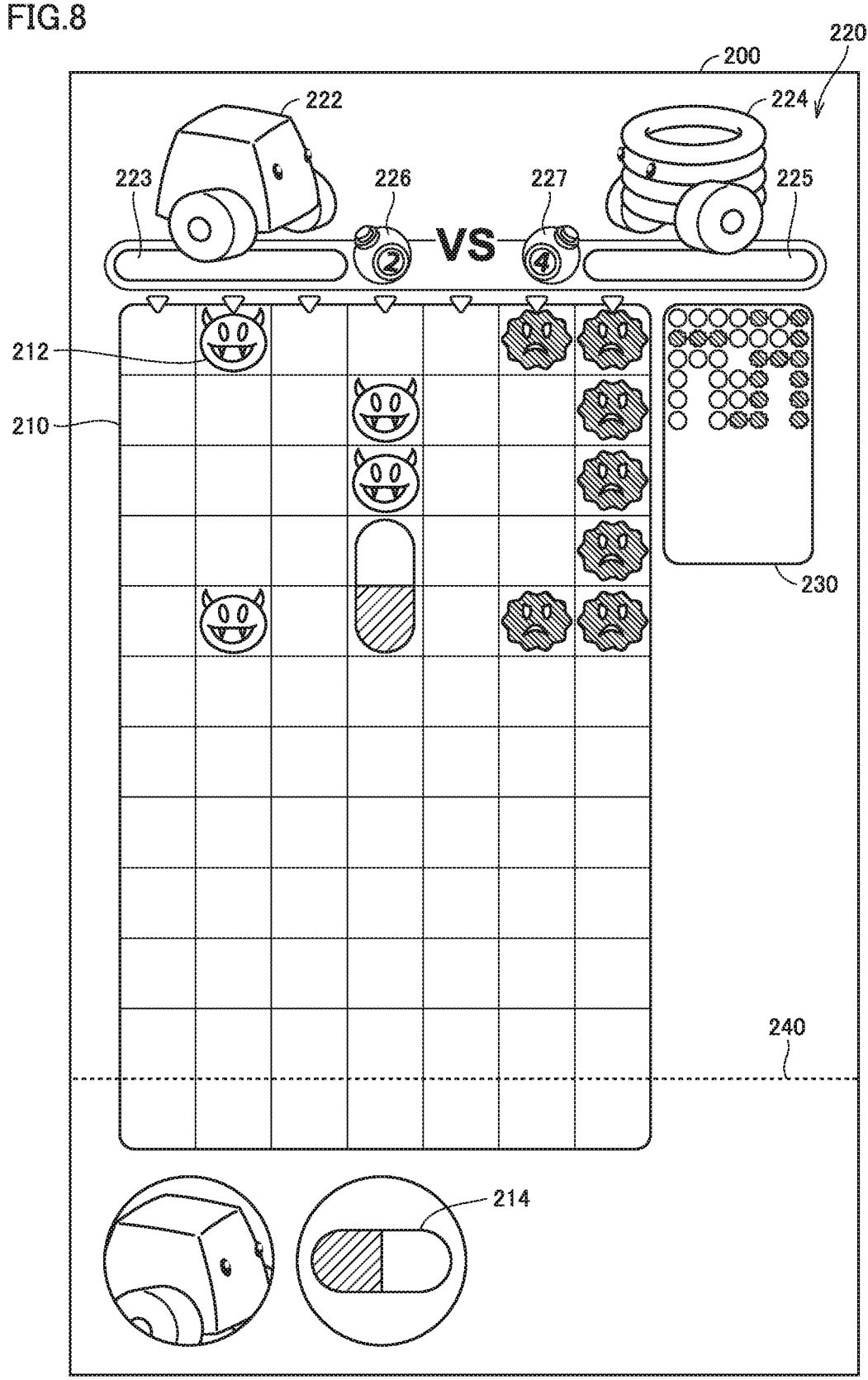
FIG. 8 shows an exemplary illustrative non-limiting diagram illustrating exemplary non-limiting elimination (No. 1) of puzzle objects according to an exemplary embodiment.

FIG. 8 is a diagram illustrating elimination (No. 1) of puzzle objects based on the embodiment.

As shown in FIG. 8, when a second puzzle object (capsule) is guided to a position under two stacked first puzzle objects (viruses), puzzle objects identical in color are aligned in the vertical direction.

Figure 9:
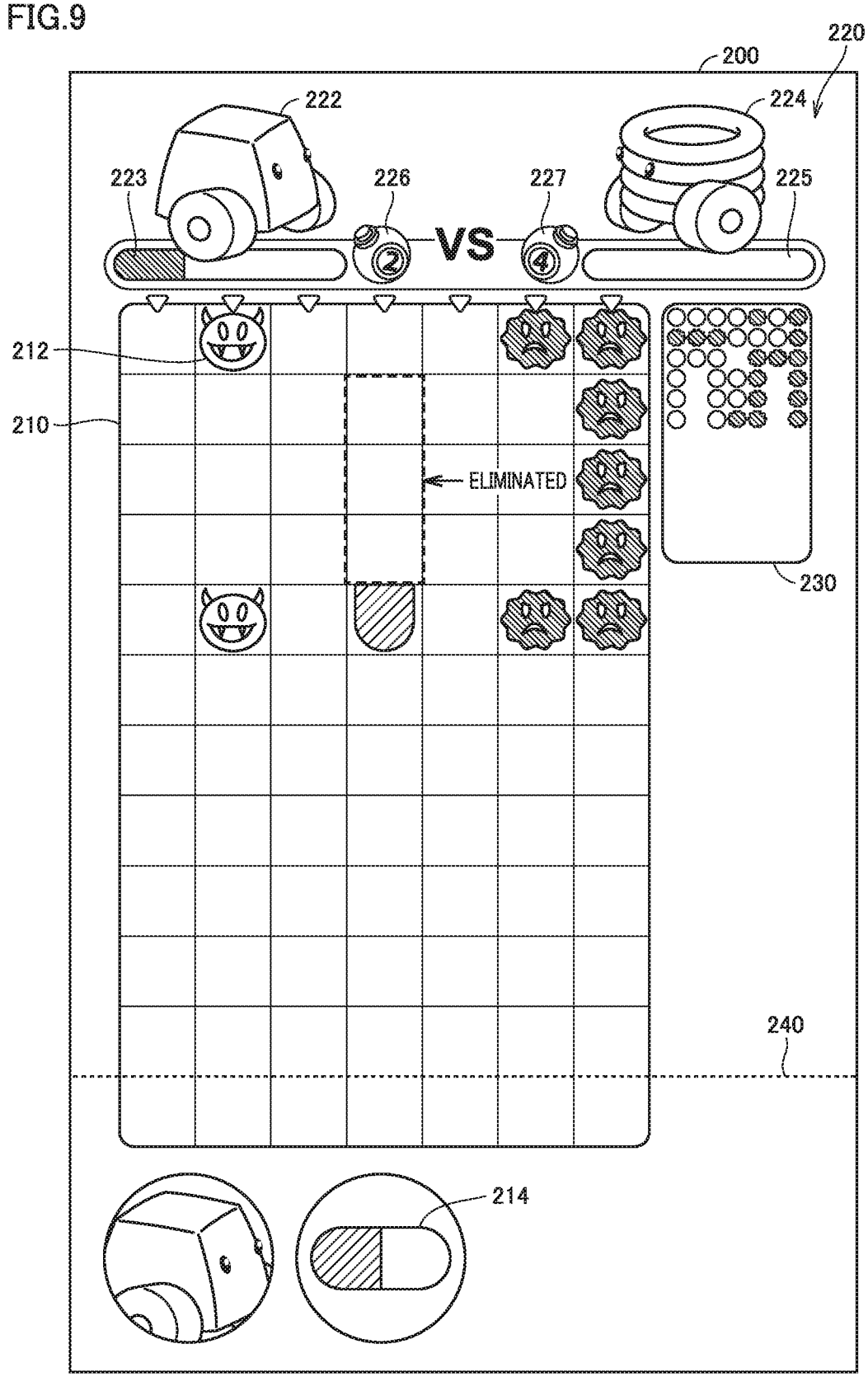
FIG. 9 shows an exemplary illustrative non-limiting diagram illustrating exemplary non-limiting elimination (No. 2) of puzzle objects according to an exemplary embodiment.

FIG. 9 is a diagram illustrating elimination (No. 2) of puzzle objects based on the embodiment.

As shown in FIG. 9, three stacked puzzle objects are eliminated. Furthermore, consequently, a part of the second puzzle object (capsule) floats in the air.

Figure 10:
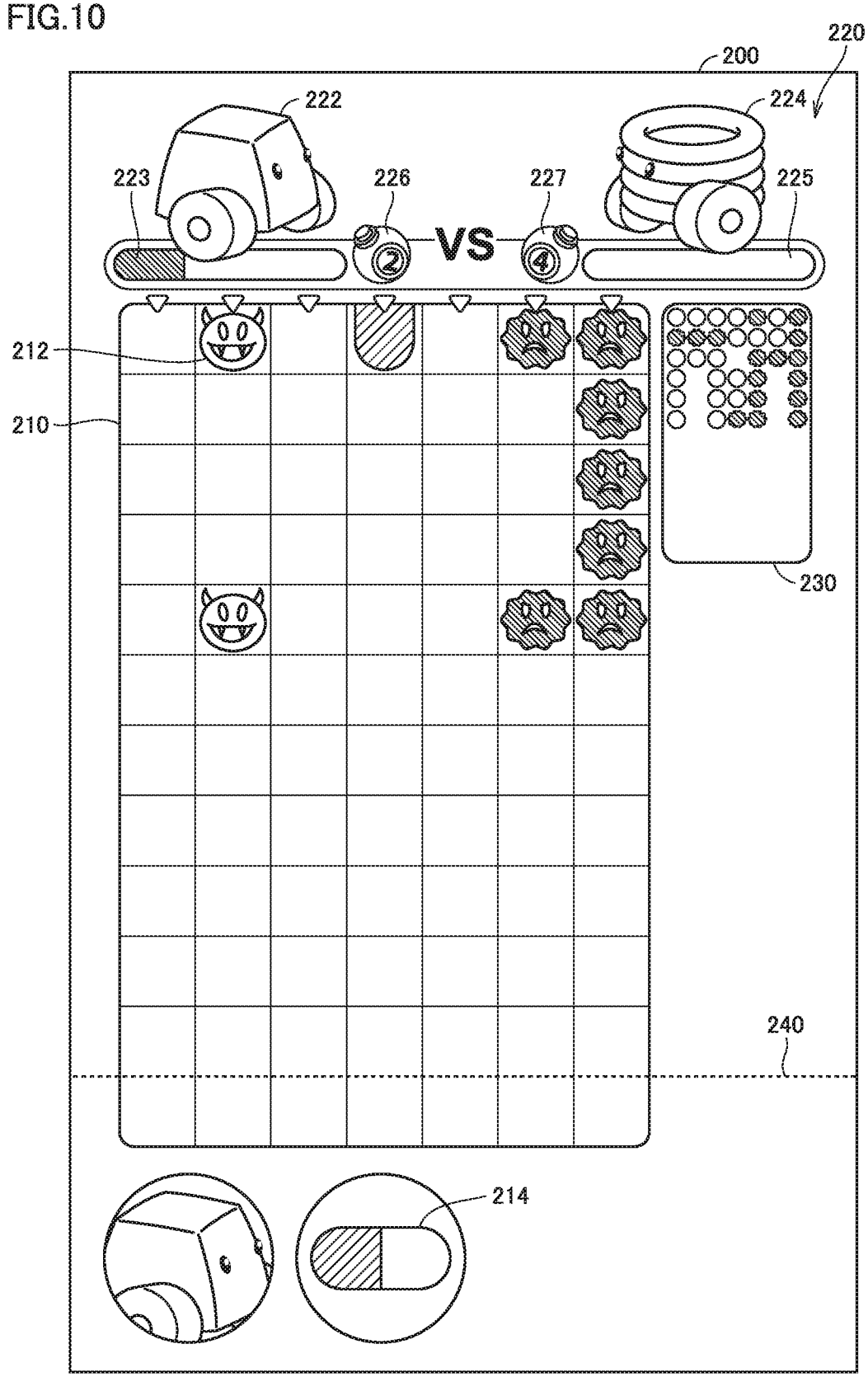
FIG. 10 shows an exemplary illustrative non-limiting diagram illustrating an exemplary non-limiting elimination (No. 3) of puzzle objects according to an exemplary embodiment.

FIG. 10 is a diagram illustrating elimination (No. 3) of puzzle objects based on the embodiment.

As shown in FIG. 10, when there is a second puzzle object (capsule) floating in the air among second puzzle objects (capsules) that have been coupled to the eliminated puzzle objects, the second puzzle object floating in the air is moved up to the upper end.

In the embodiment, when at least three puzzle objects identical in color are aligned in the vertical direction or the horizontal direction, these puzzle objects are eliminated from the screen. Limitation thereto, however, is not intended, and for example, when at least four puzzle objects identical in type (for example, shape, without being limited to the color) are aligned in a diagonal direction, these puzzle objects may be eliminated. Alternatively, for example, when four puzzle objects identical in type are arranged in a square, these puzzle objects may be eliminated.

Though the second puzzle object (capsule) is constituted of two puzzle objects in the embodiment, limitation thereto is not intended. Specifically, a puzzle object may be constituted of three or more second puzzle objects (capsules) or of a single puzzle object. Puzzle objects do not necessarily have to directly be coupled to each other.

Figure 11:
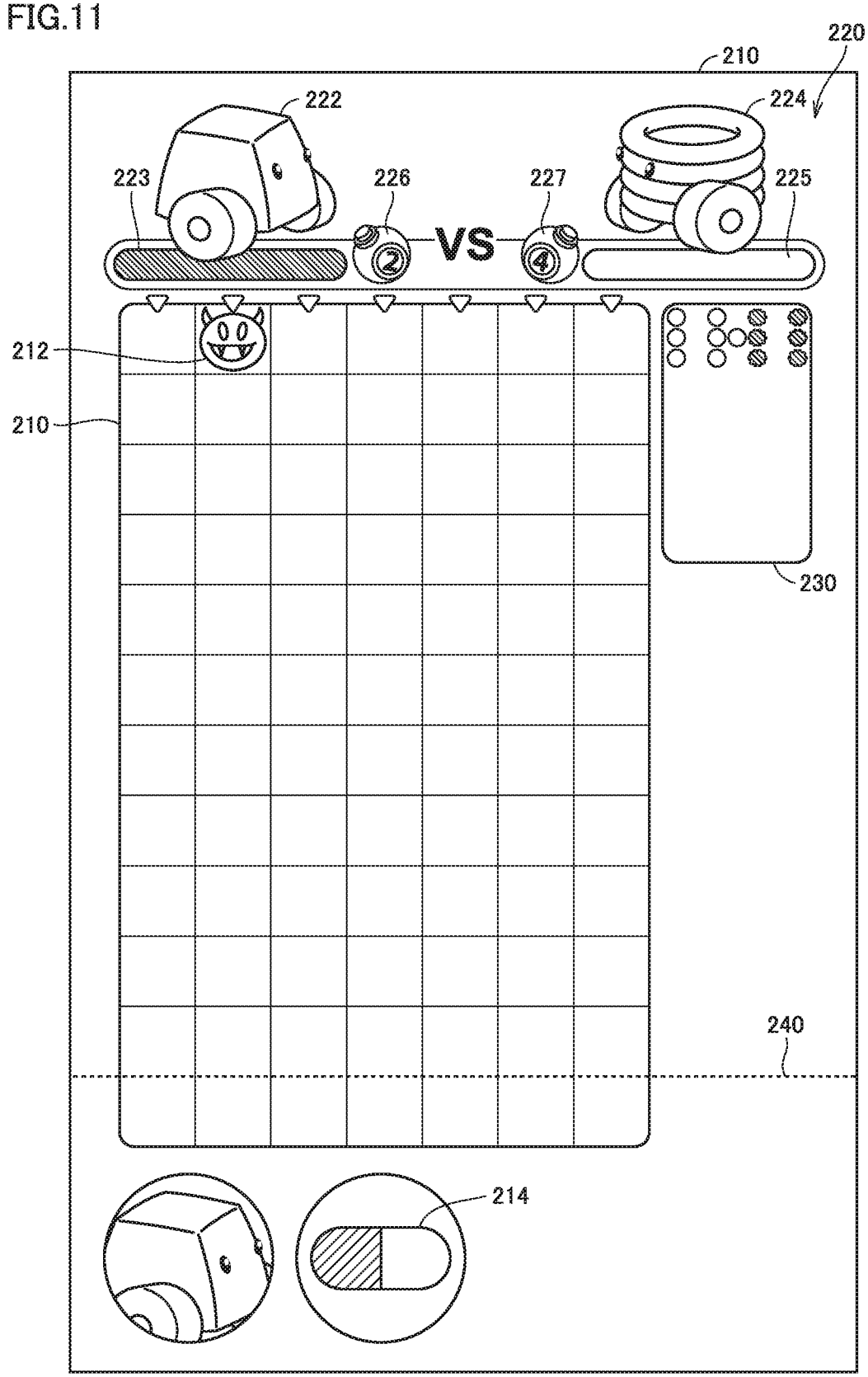
FIG. 11 shows an exemplary illustrative non-limiting diagram illustrating exemplary non-limiting generation of an offense event according to an exemplary embodiment.

FIG. 11 is a diagram illustrating generation of an offense event based on the embodiment.

As shown in FIG. 11, in character play field 220 in screen 210, offense gauges 223 and 225 are provided. A point is added as a result of elimination of puzzle objects in the game field. When added points attain to prescribed points, an offense event is generated. Offense gauge 223 is provided as a graph showing a ratio of added points to prescribed points. In the present example, added points have attained to the prescribed points. When an offense event is generated, the added points are reset.

Figure 12:
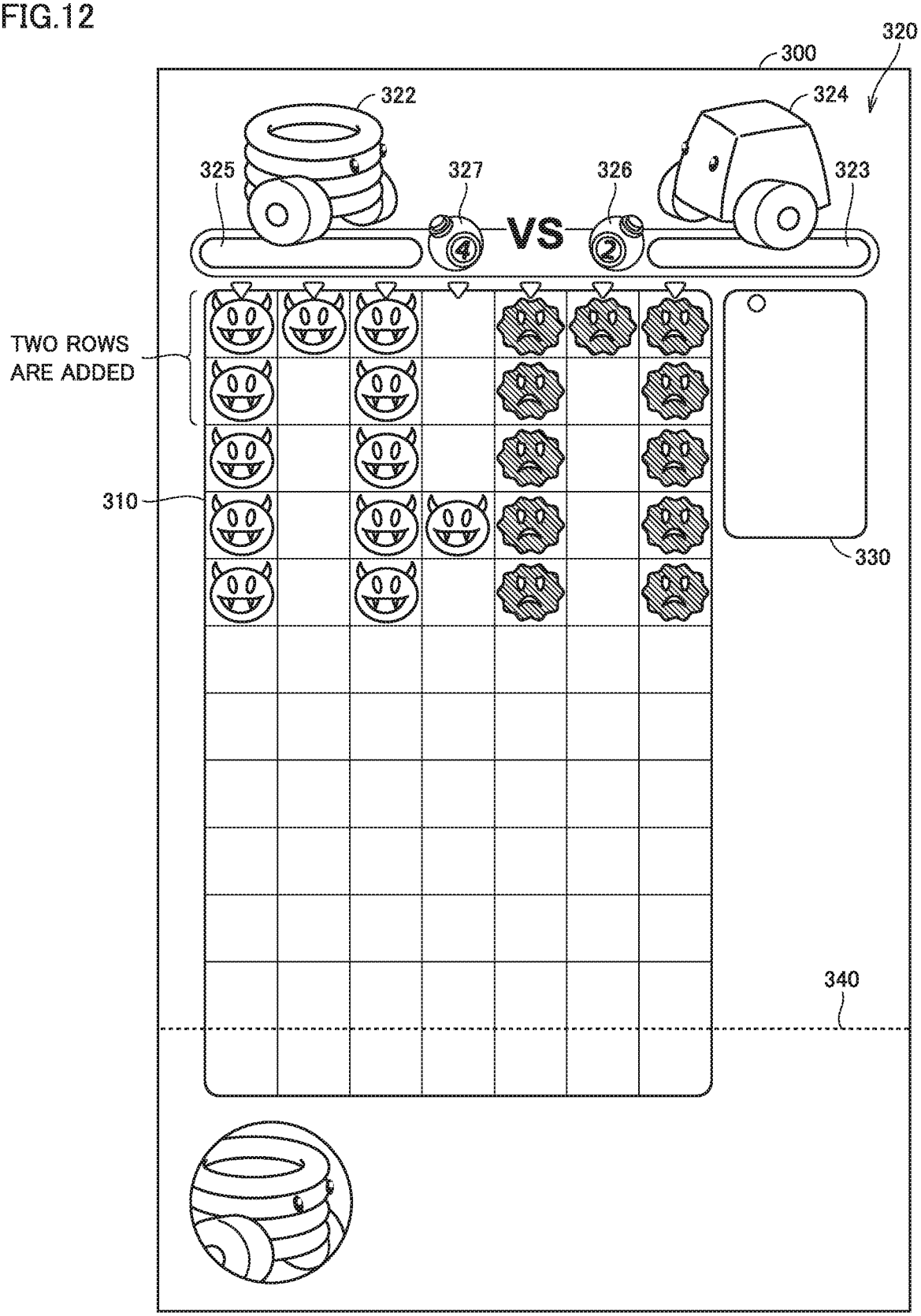
FIG. 12 shows an exemplary illustrative non-limiting diagram illustrating exemplary non-limiting execution of an offense event according to an exemplary embodiment.

FIG. 12 is a diagram illustrating an example where an offense event based on the embodiment is executed.

FIG. 12 shows a screen 300 shown on display 104 of information processing apparatus 100B in the present example.

In screen 300, a game field 310 where a puzzle object is arranged and a character play field 320 on game field 310 are provided. In character play field 320, characters that play against each other are arranged.

On the right of game field 310, a display field 330 that shows a status of the game field on an opponent side is provided.

In character play field 320, character objects 322 and 324 that play against each other are arranged. By way of example, character B and character A play against each other.

In an offense event, processing that produces an effect of interference in game field 310 in puzzle game processing is performed. In game field 310, an offense event corresponding to the numeric value "2" of the "offense ability" parameter of character A is executed. By way of example, two rows of puzzle objects are additionally arranged as compared with arrangement before generation of the offense event. Puzzle objects in game field 310 are moved downward by two rows as a whole as compared with arrangement before generation of the offense event, so that progress of puzzle game processing can be interfered.

When an offense event corresponding to the numeric value "4" of the "offense ability" parameter is executed, puzzle objects are moved downward by four rows as a whole as compared with arrangement before generation of the offense event. A limit line 340 is provided on a lower end side of game field 310. When a puzzle object crosses limit line 340, the game is over.

Figure 13:
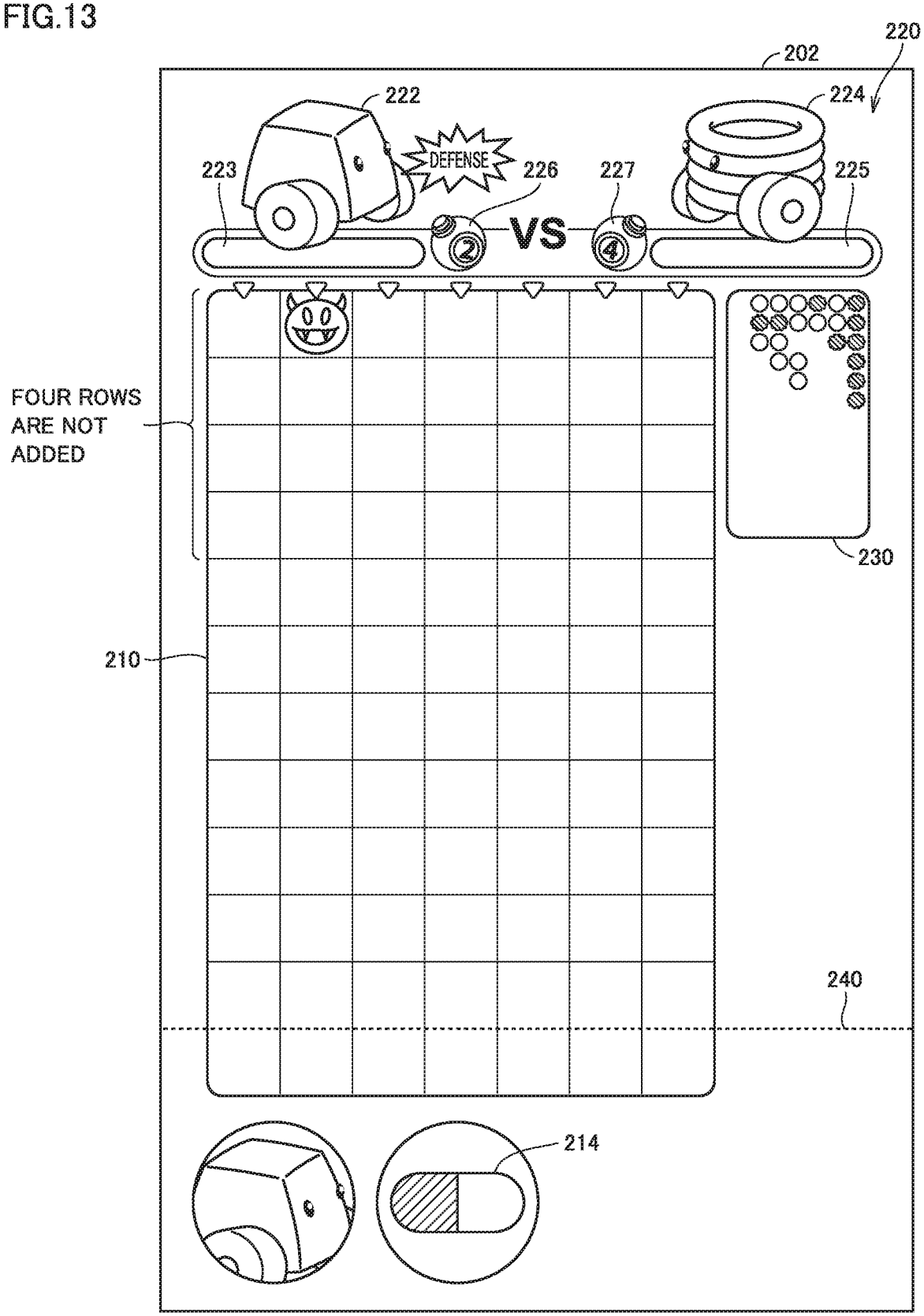
FIG. 13 shows an exemplary illustrative non-limiting diagram illustrating exemplary non-limiting execution of another offense event according to an exemplary embodiment.

FIG. 13 is a diagram illustrating an example in which another offense event based on the embodiment is executed.

FIG. 13 shows a screen 202 shown on display 104 of information processing apparatus 100A in the present example.

In character play field 220 on screen 202, offense gauges 223 and 225 are provided. By eliminating puzzle objects in the game field, a point is added. When points in offense gauge 225 attain to prescribed points, an offense event is generated. In the offense event, processing that produces an effect of interference in game field 210 in puzzle game processing is performed. In the embodiment, interference by the offense event can be avoided in accordance with the "defense ability" parameter.

Specifically, whether or not interference is avoided in accordance with the "defense ability" parameter corresponding to the "offense ability" parameter is determined.

In the present example, the numeric value "4" of the "offense ability" parameter for character B is shown. The "defense ability" parameter for character A corresponding to the numeric value "4" of the "offense ability" parameter is "20%". Therefore, interference by the offense event can be avoided with the probability of 20%.

The present example shows avoidance of interference by the offense event and shows "defense".

Therefore, since interference by the offense event corresponding to the numeric value "4" of the "offense ability" parameter is avoided, puzzle objects are not moved downward by four rows as a whole as compared with arrangement before generation of the offense event, and a status the same as before generation of the offense event is maintained. Though complete avoidance of interference by the offense event is described in the present example, interference may be lessened rather than being completely avoided. For example, interference by the offense event may be lessened in such a manner that puzzle objects are moved downward by two rows instead of four rows.

Figure 14:
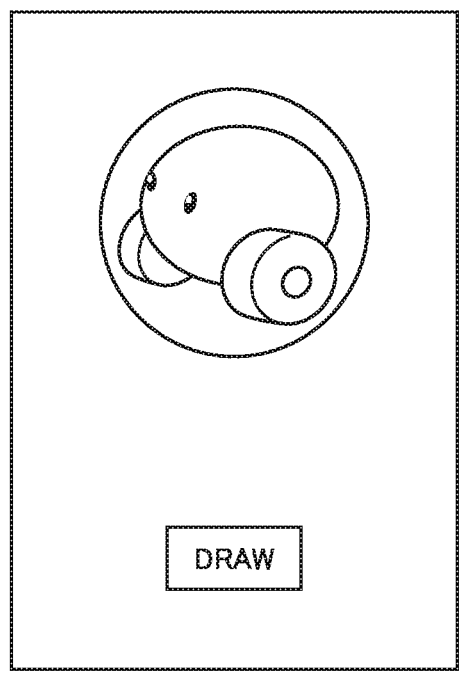
FIG. 14 shows an exemplary illustrative non-limiting diagram illustrating exemplary non-limiting draw processing according to an exemplary embodiment.

FIG. 14 is a diagram illustrating draw processing based on the embodiment.

As shown in FIG. 14, in the embodiment, a character that can be selected by a user in a draw screen can be obtained by draw processing.

In the embodiment, a plurality of selectable characters are provided in advance. Characters are different from one another in characteristics ("offense ability," "speed", and "defense ability" parameters). Combination of the "offense ability," "speed", and "defense ability" parameters is different.

For example, one character among the plurality of selectable characters can be obtained by selecting a draw button. Therefore, it is uncertain which character can be obtained. With enhanced unexpectedness, zest of puzzle game processing can be enhanced.

A user can enhance zest of puzzle game processing by collecting characters various in characteristics.

Draw processing may be performed after a winner is determined in puzzle game processing, or at other timing based on payment of virtual coins or points.

[D. Functional Block for Performing Game Processing]

Figure 15:
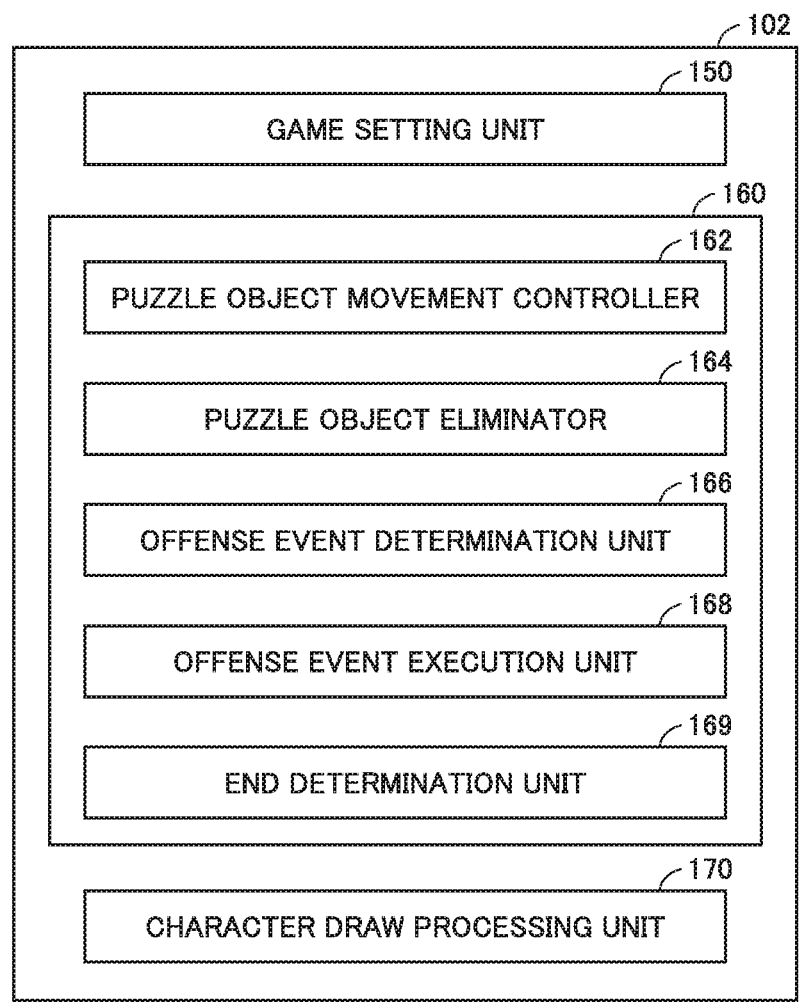
FIG. 15 shows an exemplary illustrative non-limiting diagram illustrating an exemplary non-limiting functional block of a CPU 102 that performs game processing provided by execution of game program 122 according to an exemplary embodiment.

FIG. 15 is a diagram illustrating a functional block of CPU 102 that performs game processing provided by execution of game program 122 based on the embodiment.

Referring to FIG. 15, CPU 102 includes a game setting unit 150, a game controller 160, and a character draw processing unit 170.

Game controller 160 includes a puzzle object movement controller 162, a puzzle object eliminator 164, an offense event determination unit 166, an offense event execution unit 168, and an end determination unit 169.

Game setting unit 150 accepts input by a user and performs game setting processing before start of a game.

Game controller 160 controls puzzle game processing in accordance with game setting processing.

Character draw processing unit 170 performs draw processing for obtaining a character. Specifically, the draw screen in FIG. 14 is shown where one character is selected from among a plurality of selectable characters in accordance with a selection instruction from a user and the selected character is provided to the user.

Puzzle object movement controller 162 controls arrangement and movement of a puzzle object in the game field.

Puzzle object eliminator 164 performs processing for eliminating a puzzle object in the game field. Puzzle object eliminator 164 adds a point in accordance with the number of puzzle objects eliminated in accordance with elimination processing.

Offense event determination unit 166 determines whether or not an offense event has been generated. Specifically, offense event determination unit 166 determines whether or not points in accordance with the number of eliminated puzzle objects that represent a status of progress of puzzle game processing are equal to or more than prescribed points during puzzle game processing.

Specifically, offense event determination unit 166 determines whether or not points shown in offense gauge 223 or 225 have attained to prescribed points.

Offense event execution unit 168 executes an offense event that produces an effect of interference in the game field in puzzle game processing. Specifically, offense event execution unit 168 determines a degree of interference with progress of puzzle game processing based on the "offense ability" parameter corresponding to the character set by game setting unit 150, in the game field in puzzle game processing. Offense event execution unit 168 determines lessening of interference with progress of puzzle game processing based on the "defense ability" parameter corresponding to the character set by game setting unit 150.

Specifically, when the offense event corresponding to the numeric value "2" of the "offense ability" parameter is executed, offense event execution unit 168 additionally arranges two rows of puzzle objects as compared with arrangement before generation of the offense event. Offense event execution unit 168 determines whether or not to avoid interference in accordance with the "defense ability" parameter corresponding to the "offense ability" parameter, and when interference is avoided, a status the same as before generation of the offense event is maintained.

End determination unit 169 determines whether or not a puzzle object arranged in the game field in puzzle game processing has crossed the prescribed limit line in the game field. When end determination unit 169 determines that the puzzle object has crossed the limit line, it quits puzzle game processing.

[E. Processing Procedure in Game Processing]

A processing procedure in game processing provided by execution of game program 122 according to the embodiment will now be described.

Figure 16:
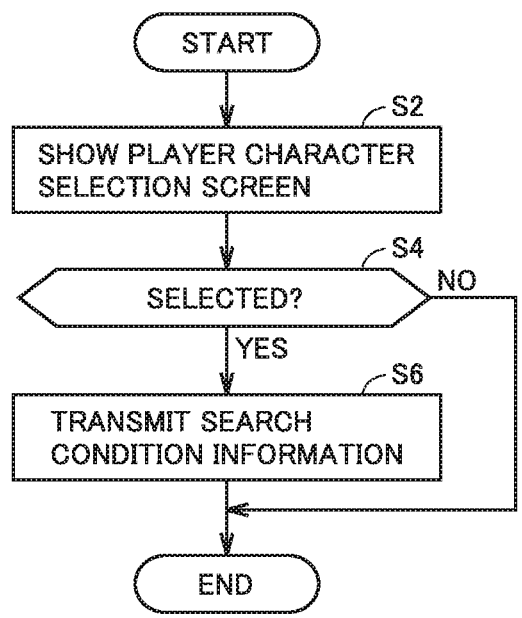
FIG. 16 shows an exemplary illustrative non-limiting flowchart illustrating exemplary non-limiting processing for transmitting data from information processing apparatus 100 to server 50 provided by game program 122 according to an exemplary embodiment.

FIG. 16 is a flowchart illustrating processing for transmitting data from information processing apparatus 100 to server 50 provided by game program 122 based on the embodiment.

Each step shown in FIG. 16 is performed by execution of game program 122 by CPU 102 of information processing apparatus 100.

Referring to FIG. 16, when game processing is started, CPU 102 has a user character selection acceptance screen 600 shown (step S2). Specifically, game setting unit 150 has selection acceptance screen 600 described with reference to FIG. 4 shown. In selection acceptance screen 600, a user can select a user character to be operated by the user himself/herself from user character list 602. In the present example, user character 604 is selected.

Then, CPU 102 determines whether or not it has accepted selection of the user character (step S4). Specifically, game setting unit 150 determines whether or not it has accepted selection of "OK" button 620 in selection acceptance screen 600.

When CPU 102 determines in step S4 that it has accepted selection of the user character (YES in step S4), it transmits information on a search condition to server 50 (step S6). Game setting unit 150 transmits the information on the search condition for performing processing for searching for an opponent to server 50 through network communication unit 106. Then, the process ends (end).

When CPU 102 determines in step S4 that it has not accepted selection of a user character (NO in step S4), the process ends. For example, when CPU 102 accepts selection of "cancel" button 622 in selection acceptance screen 600, the process ends (end).

Figure 17:
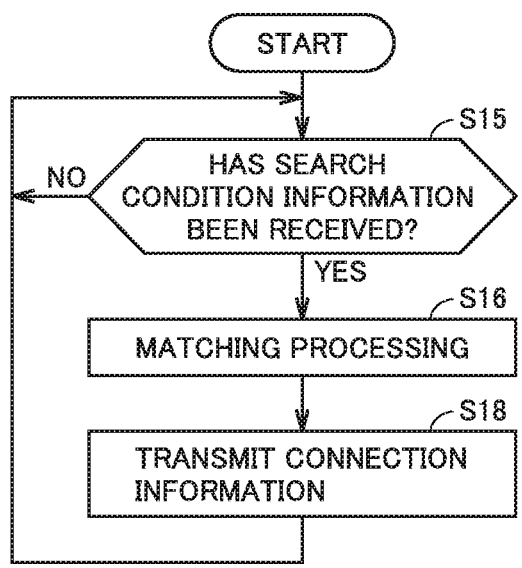
FIG. 17 shows an exemplary illustrative non-limiting flowchart showing an exemplary non-limiting procedure in matching processing by server 50 according to an exemplary embodiment.

FIG. 17 is a flowchart showing a procedure in matching processing by server 50 based on the embodiment.

Each step shown in FIG. 17 is performed by execution of matching processing program 64 by CPU 52 of server 50.

Referring to FIG. 17, when matching processing is started, CPU 52 determines whether or not it has received the information on the search condition (step S15).

In step S15, CPU 52 stands by until it receives the information on the search information (NO in step S15), and when the CPU has received the information, the process proceeds to the next step S16.

Then, CPU 52 performs matching processing (step S16). Specifically, the CPU performs matching processing for determining combination based on the received information on the search condition and other information on a search condition that has already been received.

Then, CPU 52 transmits connection information in accordance with the combination determined in the matching processing (step S18). Specifically, CPU 52 transmits connection information to information processing apparatus 100 that satisfies the condition through network communication unit 56.

The process then returns to step S15.

Specifically, server 50 transmits to information processing apparatus 100A, connection information (an IP address or the like) for connection over the network for performing processing for data communication with information processing apparatus 100B. Server 50 transmits to information processing apparatus 100B, connection information (an IP address or the like) for connection over the network for performing processing for data communication with information processing apparatus 100A.

Figure 18:
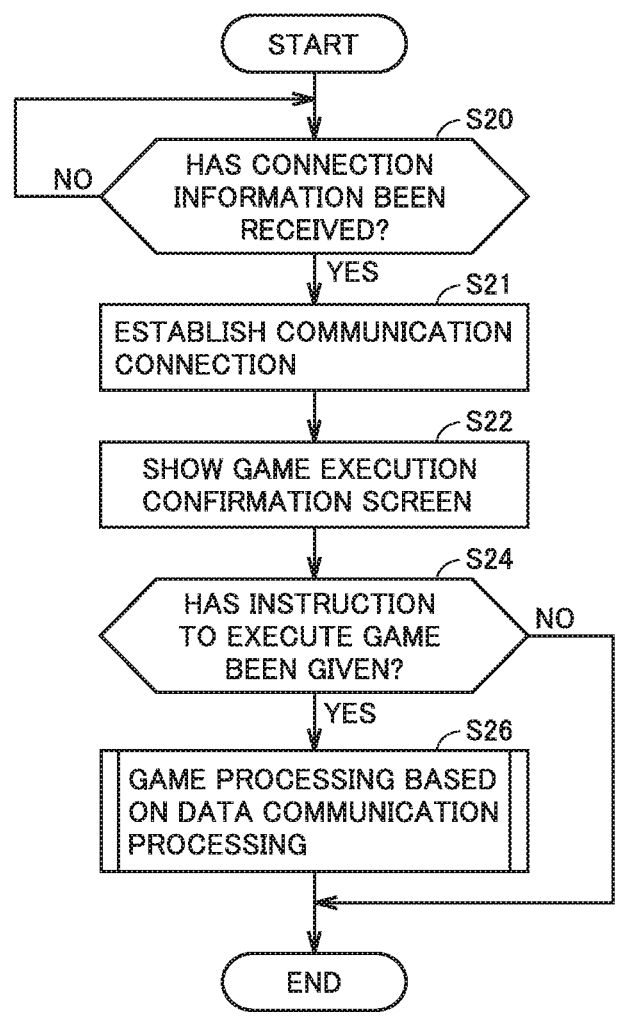
FIG. 18 shows an exemplary illustrative non-limiting flowchart illustrating exemplary non-limiting processing for data communication between information processing apparatus 100 and another information processing apparatus provided by game program 122 according to an exemplary embodiment.

FIG. 18 is a flowchart illustrating processing for data communication between information processing apparatus 100 and another information processing apparatus provided by game program 122 based on the embodiment.

Each step shown in FIG. 18 is performed by execution of game program 122 by CPU 102 of information processing apparatus 100.

Referring to FIG. 18, CPU 102 determines whether or not it has received connection information (step S20). Specifically, game setting unit 150 determines whether or not it has received from server 50 through network communication unit 106, connection information for connection over the network for performing processing for data communication with another information processing apparatus.

In step S20, CPU 102 stands by until it receives connection information (NO in step S20), and when the CPU determines that it has received the connection information (YES in step S20), it establishes communication connection (step S21). Specifically, game setting unit 150 establishes communication connection for performing processing for data communication over the network based on the connection information. By way of example, information processing apparatus 100A obtains from server 50, connection information (an IP address) for performing processing for data communication with information processing apparatus 100B.

After communication connection is established, CPU 102 has the game execution confirmation screen shown (step S22). Game setting unit 150 has game execution confirmation screen 800 described with reference to FIG. 5 shown.

After communication connection is established, information processing apparatus 100A obtains from information processing apparatus 100B, information on a character (user character) of information processing apparatus 100B that executes a game.

Then, CPU 102 determines whether or not an instruction to execute the game has been given (step S24). Specifically, when game setting unit 150 has accepted selection of "YES" button 806 in game execution confirmation screen 800, it determines that the instruction to execute the game has been given.

Then, when CPU 102 determines in step S24 that the instruction to execute the game has been given (YES in step S24), it performs game processing based on data communication processing (step S26). Game setting unit 150 instructs game controller 160 to perform game processing. Information processing apparatus 100A transmits and receives game processing data to and from information processing apparatus 100B. Specifically, information processing apparatus 100A transmits to information processing apparatus 100B, game processing data based on an operation by the user of information processing apparatus 100A over network 10. Information processing apparatus 100B transmits to information processing apparatus 100A, game processing data based on an operation by the user of information processing apparatus 100B over network 10. Information processing apparatus 100A performs real-time play-against-type game processing as described with reference to FIG. 6, based on game processing data resulting from operations by the user of information processing apparatus 100A and game processing data resulting from operations by the user of information processing apparatus 100B. This is also applicable to information processing apparatus 100B.

After game processing ends, the process ends (end).

When CPU 102 determines in step S24 that no instruction to execute the game has been given (NO in step S24), the process ends (end). Specifically, when the user selects "NO"

button 808 in execution confirmation screen 800, it is determined that no instruction to execute the game has been given and the process ends.

Figure 19:
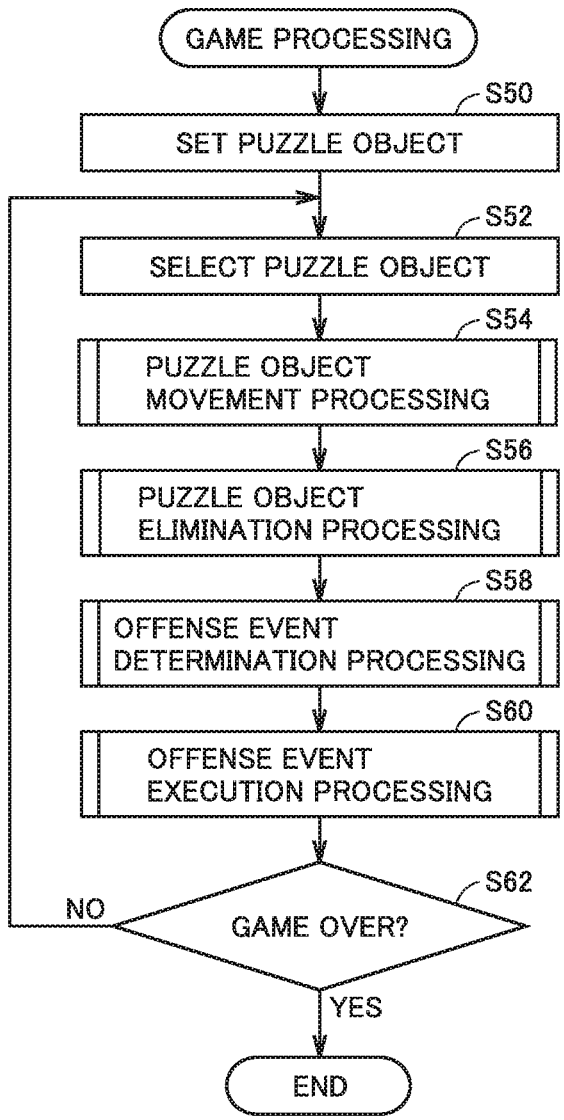
FIG. 19 shows an exemplary illustrative non-limiting flowchart illustrating exemplary non-limiting play-against-type game processing in information processing apparatus 100 provided by game program 122 according to an exemplary embodiment.

FIG. 19 is a flowchart illustrating play-against-type game processing in information processing apparatus 100 provided by game program 122 based on the embodiment.

Each step shown in FIG. 19 is performed by execution of game program 122 by CPU 102 of information processing apparatus 100.

Referring to FIG. 19, CPU 102 sets a puzzle object (step S50). As shown in FIG. 6, puzzle object movement controller 162 arranges a first puzzle object (virus) in game field 210.

Then, CPU 102 selects a puzzle object (step S52). Puzzle object movement controller 162 selects a second puzzle object (capsule). The capsule is divided into two halves, and selection is made between two halves identical in type and two halves which are combination of different types.

Then, CPU 102 performs puzzle object movement processing (step S54).

Specifically, puzzle object movement controller 162 performs puzzle object movement processing. Puzzle object movement processing will be described later.

Then, CPU 102 performs puzzle object elimination processing (step S56).

Specifically, puzzle object eliminator 164 performs puzzle object elimination processing. Puzzle object elimination processing will be described later.

Then, CPU 102 performs offense event determination processing (step S58).

Specifically, offense event determination unit 166 performs offense event determination processing. Offense event determination processing will be described later.

Then, CPU 102 performs offense event execution processing (step S60).

Specifically, offense event execution unit 168 performs offense event execution processing. Offense event execution processing will be described later.

Then, CPU 102 determines whether or not a game is over (step S62).

Specifically, end determination unit 169 determines whether or not a game is over by determining whether or not a predetermined condition has been satisfied. When a puzzle object has crossed limit line 240 in the game field, end determination unit 169 determines that the game is over. A user of which puzzle object has crossed limit line 240 in the game field is determined as the loser and a user of which puzzle object has not crossed the limit line is determined as the winner.

When CPU 102 determines that the game has not been over (NO in step S62), the process returns to step S52 and game processing is continued.

Figure 20:
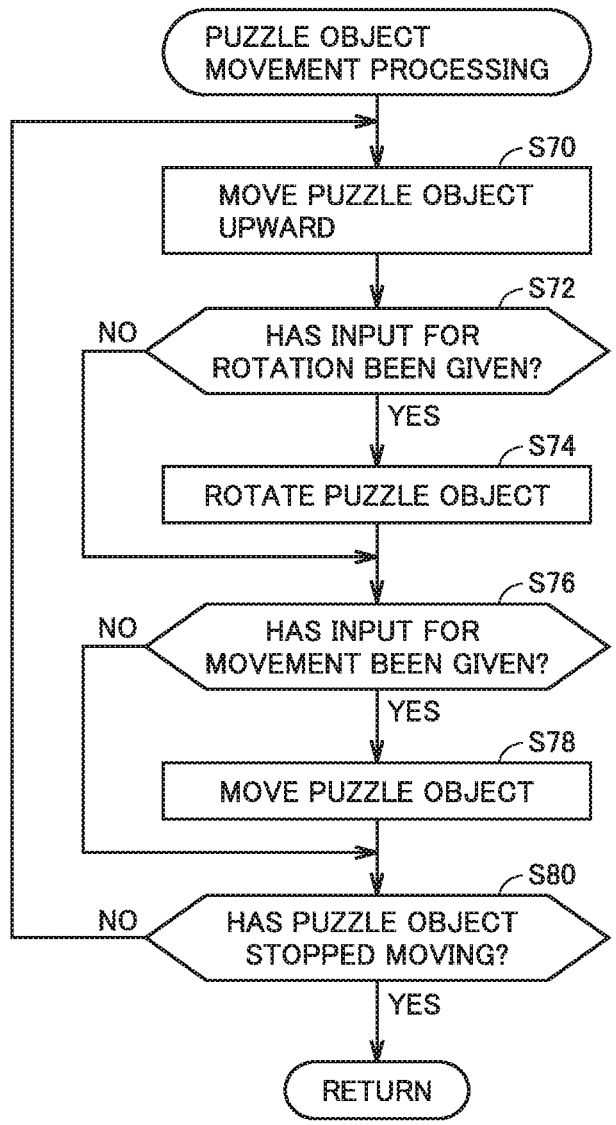
FIG. 20 shows an exemplary illustrative non-limiting flowchart illustrating exemplary non-limiting puzzle object movement processing according to an exemplary embodiment.

FIG. 20 is a flowchart illustrating puzzle object movement processing based on the embodiment.

Each step shown in FIG. 20 is performed by execution of game program 122 by CPU 102 of information processing apparatus 100.

Referring to FIG. 20, CPU 102 moves a puzzle object upward (step S70). Puzzle object movement controller 162 moves the second puzzle object (capsule) upward at a constant speed from the central portion at the lower end of the game field.

Then, CPU 102 determines whether or not an input for rotation has been given (step S72). Puzzle object movement controller 162 determines whether or not the second puzzle object (capsule) has been touched through input unit 110.

When CPU 102 determines that an input for rotation has been given (YES in step S72), it rotates the puzzle object (step S74). When puzzle object movement controller 162 determines that the second puzzle object (capsule) has been touched through input unit 110, it rotates the second puzzle object (capsule) as described with reference to FIG. 7.

When CPU 102 determines that no input for rotation has been given (NO in step S72), step S74 is skipped and the process proceeds to step S76.

Then, CPU 102 determines whether or not an input for movement has been given (step S76).

When CPU 102 determines in step S76 that the input for movement has been given (YES in step S76), it moves the puzzle object (step S78). When puzzle object movement controller 162 determines that an operation to slide the second puzzle object (capsule) to the right or left while the second puzzle object (capsule) is touched is performed through input unit 110, it moves the second puzzle object (capsule) to the right or left.

When CPU 102 determines that no input for movement has been given (NO in step S76), step S78 is skipped and the process proceeds to step S80.

CPU 102 determines in step S80 whether or not the puzzle object has stopped moving (step S80). Puzzle object movement controller 162 determines whether or not the puzzle object has hit the upper end of the game field or any first or second puzzle object (a capsule or a virus). When puzzle object movement controller 162 determines that the puzzle object has hit the upper end of the game field or any first or second puzzle object (a capsule or a virus), it stops the puzzle object.

When CPU 102 determines in step S80 that the puzzle object has stopped moving (YES in step S80), the process ends (return).

When CPU 102 determines in step S80 that the puzzle object has not stopped moving (NO in step S80), the process returns to step S70 and the processing above is repeated.

Figure 21:
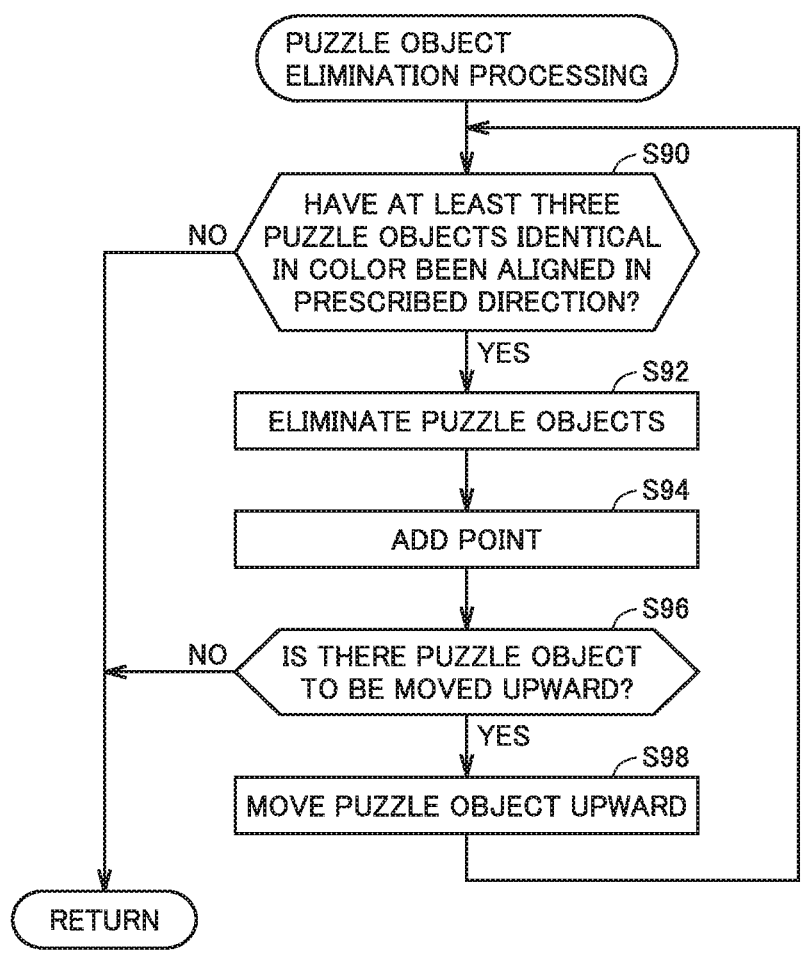
FIG. 21 shows an exemplary illustrative non-limiting flowchart illustrating exemplary non-limiting puzzle object elimination processing according to an exemplary embodiment.

FIG. 21 is a flowchart illustrating puzzle object elimination processing based on the embodiment.

Each step shown in FIG. 21 is performed by execution of game program 122 by CPU 102 of information processing apparatus 100.

Referring to FIG. 21, CPU 102 determines whether or not at least three puzzle objects identical in color have been aligned in a prescribed direction (step S90). Puzzle object eliminator 164 determines whether or not at least three puzzle objects identical in color have been aligned in the prescribed direction as described with reference to FIG. 8.

When CPU 102 determines in step S90 that at least three puzzle objects identical in color have been aligned in the prescribed direction, it eliminates the puzzle objects (step S92). When puzzle object eliminator 164 determines that at least three puzzle objects identical in color have been aligned in the prescribed direction, it eliminates the puzzle objects as described with reference to FIG. 9.

Then, CPU 102 adds a point (step S94). Puzzle object eliminator 164 adds a point in accordance with the number of eliminated puzzle objects as a point.

Then, CPU 102 determines whether or not there is a puzzle object to be moved upward (step S96). Puzzle object eliminator 164 determines whether or not there is a floating second puzzle object (capsule) in the air, among second puzzle objects (capsules) that have been coupled to the eliminated puzzle objects.

When CPU 102 determines in step S96 that there is a puzzle object to be moved upward (YES in step S96), it moves the puzzle object upward (step S98). When puzzle object eliminator 164 determines that there is a second puzzle object (capsule) floating in the air among the second puzzle objects (capsules) that have been coupled to the eliminated puzzle objects as described with reference to FIG. 10, it moves the floating second puzzle object up to the upper end.

Then, the process returns to step S90 and the processing is repeated.

When CPU 102 determines in step S90 that at least three puzzle objects identical in color have not been aligned in the prescribed direction (NO in step S90), the process ends (return).

When CPU 102 determines in step S96 that there is no puzzle object to be moved upward (NO in step S96), the process ends (return).

Figure 22:
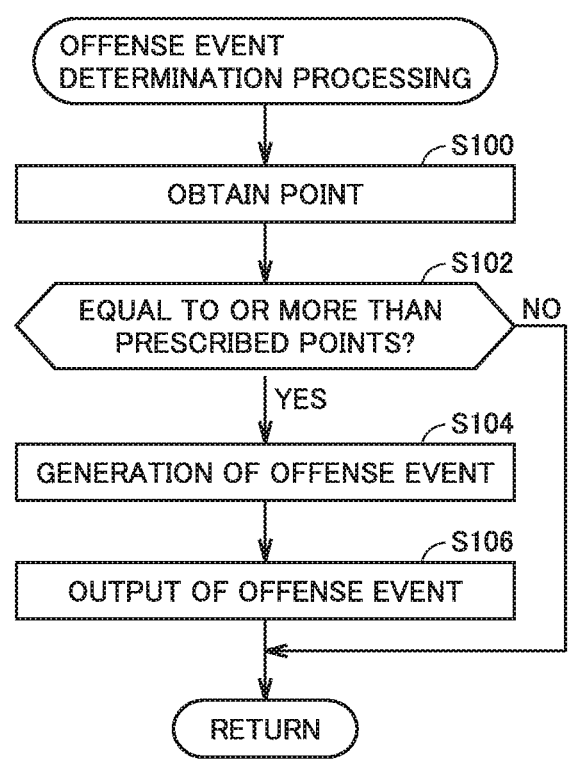
FIG. 22 shows an exemplary illustrative non-limiting flowchart illustrating exemplary non-limiting offense event determination processing according to an exemplary embodiment.

FIG. 22 is a flowchart illustrating offense event determination processing based on the embodiment.

Each step shown in FIG. 22 is performed by execution of game program 122 by CPU 102 of information processing apparatus 100.

Referring to FIG. 22, CPU 102 obtains a point (step S100). Offense event determination unit 166 obtains a point added in accordance with the number of eliminated puzzle objects.

CPU 102 then determines whether or not the obtained points are equal to or more than prescribed points (step S102). Offense event determination unit 166 determines whether or not points added in accordance with the number of eliminated puzzle objects are equal to or more than the prescribed points. The prescribed points are set in advance in accordance with the "speed" parameter of a user character.

The prescribed points may be set based on the "speed" parameter or the "offense ability" parameter.

For example, by setting a value of the prescribed points to be larger when the numeric value of the "offense ability" parameter is large and setting a value of the prescribed points to be smaller when the numeric value of the "offense ability" parameter is small, generation of an offense event can be more likely when the numeric value of the "offense ability" parameter is small than when the numeric value of the "offense ability" parameter is large.

When CPU 102 determines in step S102 that the obtained points are equal to or more than the prescribed points (YES in step S102), it generates an offense event (step S104). When offense event determination unit 166 determines that the obtained points are equal to or more than the prescribed points, it generates an offense event.

Then, CPU 102 outputs the offense event (step S106). Offense event determination unit 166 transmits game processing data including generation of the offense event and the "offense ability" parameter over network 100 to information processing apparatus 100 of the opponent.

Then, the process ends (return).

When it is determined in step S102 that the obtained points are not equal to or more than the prescribed points (NO in step S102), the process ends (return).

Figure 23:
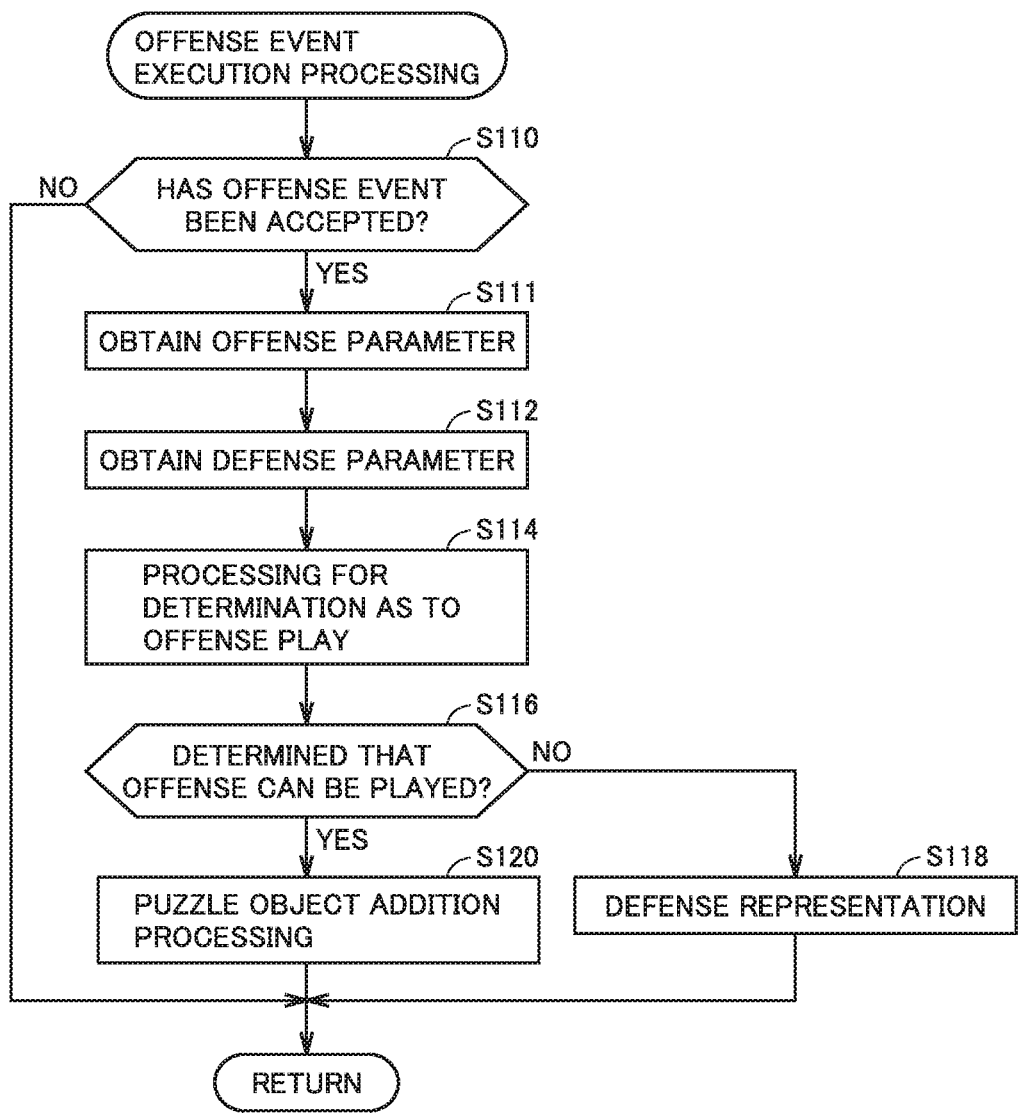
FIG. 23 shows an exemplary illustrative non-limiting flowchart illustrating exemplary non-limiting offense event execution processing according to an exemplary embodiment.

FIG. 23 is a flowchart illustrating offense event execution processing based on the embodiment.

Each step shown in FIG. 23 is performed by execution of game program 122 by CPU 102 of information processing apparatus 100.

Referring to FIG. 23, CPU 102 determines whether or not it has accepted the offense event (step S110). Offense event execution unit 168 determines whether or not it has received game processing data including generation of the offense event and the "offense ability" parameter transmitted from information processing apparatus 100 of the opponent over network 10.

When CPU 102 has not accepted the offense event in step S110 (NO in step S110), the process ends (return).

When CPU 102 has accepted the offense event in step S110 (YES in step S110), it obtains the "offense ability" parameter (step S111). Offense event execution unit 168 obtains the "offense ability" parameter included in game processing data transmitted from information processing apparatus 100 of the opponent over network 10.

Then, CPU 102 obtains the "defense ability" parameter (step S112). Specifically, the CPU obtains the "defense ability" parameter corresponding to the "offense ability" parameter obtained at the time when it has accepted the offense event. Offense event execution unit 168 obtains the "defense ability" parameter of a user character corresponding to the obtained "offense ability" parameter.

Then, CPU 102 performs processing for determination as to offense play. Specifically, offense event execution unit 168 performs processing for determination as to offense play based on the "defense ability" parameter. In processing for determination as to offense play, whether or not an offense can be played is determined based on a probability representing the "defense ability" parameter and random number data.

Then, CPU 102 determines whether or not an offense can be played (step S116). Offense event execution unit 168 determines whether or not an offense can be played in processing for determination as to offense play.

When CPU 102 determines in step S116 that an offense can be played (YES in step S116), it performs puzzle object addition processing (step S120). When offense event execution unit 168 determines that an offense can be played in processing for determination as to offense play, it performs processing for adding a puzzle object. Specifically, when offense event execution unit 168 executes an offense event corresponding to the numeric value "2" of the "offense ability" parameter, it performs processing for additionally arranging two rows of puzzle objects as compared with arrangement before generation of the offense event.

Then, the process ends (return).

When CPU 102 determines in step S116 that an offense cannot be played (NO in step S116), it performs defense representation processing (step S118).

When offense event execution unit 168 determines that an offense cannot be played in processing for determination as to offense play, it does not perform processing for adding a puzzle object but maintains a status the same as before generation of the offense event. Offense event execution unit 168 performs processing for showing "defense" indicating that interference has been avoided.

Then, the process ends (return).

Through the processing, processing for producing, as an offense event, an effect of interference in accordance with the "offense ability" parameter in game field 210 in puzzle game processing can be performed. Interference by the offense event can be avoided in accordance with the "defense ability" parameter. A status of a game is not varied only by game skills of a user but game development can be diversified.

Since characters are different from one another in characteristics ("offense ability," "speed", and "defense ability" parameters), compatibility in playing a game against each other is also created. Since advantageous progress of a game based only on game skills of a user can be avoided, development of the game can be diversified and zest of puzzle game processing can be enhanced.

[Modification]

Various types of processing relating to puzzle game processing are performed in each of information processing apparatuses 100A and 100B in the embodiment. Specifically, in the embodiment, information processing apparatuses 100A and 100B both obtain connection information so that data communication processing can be performed without server 50.

The processing above, however, may be performed entirely by server 50.

For example, a result of processing by server 50 may be output to information processing apparatuses 100A and 100B and shown in each of information processing apparatuses 100A and 100B.

Though game processing in which two players play against each other is performed in the embodiment, game processing in which teams each constituted of a plurality of members may play against each other may be performed. In this case, when it is determined that points obtained by a team is equal to or more than prescribed points, an offense event against an opponent team may be generated.

In the embodiment, a user selects a character to be used and an offense event is executed by using three parameters including "offense ability," "speed", and "defense ability" parameters associated with the character. Without being limited to the character, for example, the embodiment is also similarly applicable to selection of an item (equipment) to which three "offense ability," "speed", and "defense ability" parameters are allocated. Without being limited to the item to which the three parameters are allocated, for example, a tactics or a command to which the three parameters are allocated may be applicable.

Though a puzzle object is additionally arranged as an offense event in the embodiment, limitation to additional arrangement of a puzzle object is not intended. For example, processing for interfering progress by changing a position of a puzzle object arranged in the game field may be performed. Alternatively, processing for interfering progress by making an area of the game field smaller may be performed. Processing for interfering progress by changing a speed of a puzzle object that moves upward may be performed.

In the present example, a probability of avoidance of an offense event is described as "defense ability." Without being limited in particular as such, for example, a ratio of lessening at which offense can be lessened may be defined as "defense ability." For example, a ratio of lessening of offense corresponding to a numeric value "1" of the "offense ability" parameter may be "10%", a ratio of lessening of offense corresponding to a numeric value "2" of the "offense ability" parameter may be "30%", a ratio of lessening of offense corresponding to a numeric value "3" of the "offense ability" parameter may be "40%", and a ratio of lessening of offense corresponding to a numeric value "4" of the "offense ability" parameter may be "20%".

An application executable by a personal computer may be provided as a program in the embodiment. At this time, the program according to the embodiment may be incorporated as a function of some of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system configured to perform puzzle game processing for a puzzle game played against each other by a plurality of users, the information processing system comprising:
    a processor; and
    a memory configured to store computer readable instructions that, when executed by the processor, cause the information processing system to provide execution comprising:
        designating a game element with which a first parameter and a plurality of second parameters are associated for each of the plurality of users;
        performing the puzzle game processing based on an operation by each of the plurality of users onto a puzzle object arranged in a game field; and
        executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
    during execution of the offense event, a degree of interference being determined based on the first parameter associated with the game element designated for the one user,
    during execution of the offense event, the determined degree of interference being lessened based on a second parameter associated with the game element designated for the opponent, and
    executing the offense event includes lessening the determined degree of interference based on the second parameter corresponding to the first parameter among the plurality of second parameters associated with the game element designated for the opponent.

2. The information processing system according to claim 1, wherein
    the second parameter includes a probability with which interference with progress of the puzzle game processing is lessened.

3. The information processing system according to claim 1, wherein
    each of the users is provided with at least one game element of a plurality of game elements based on a draw, and
    designating the game element includes designating, in accordance with an operation by the user, at least one game element provided to each user by providing the game element based on the draw.

4. The information processing system according to claim 1, wherein one set of specific first and second parameters is set for each of a plurality of game elements.

5. The information processing system according to claim 4, wherein
    a combination pattern of the first and second parameters associated with each game element among the plurality of game elements is different for each game element.

6. The information processing system according to claim 1, wherein the information processing system is further caused to provide execution comprising determining whether the status of progress of the puzzle game processing satisfies the offense condition, wherein the offense condition is different depending on the first parameter associated with the game element.

7. The information processing system according to claim 6, wherein
the offense condition is set to be satisfied more readily or less readily as the first parameter is larger.

8. The information processing system according to claim 1, wherein
performing the puzzle game processing includes performing the puzzle game processing for eliminating a puzzle object arranged in the game field, based on an operation by each user onto the puzzle object, and
executing the offense event includes determining the number of puzzle objects to additionally be arranged in the game field in the puzzle game processing for the opponent, based on the first parameter associated with the game element designated for the one user.

9. The information processing system according to claim 8, wherein the information processing system is further caused to provide execution comprising determining whether the status of progress of the puzzle game processing satisfies the offense condition, wherein
determining whether the status of progress of the puzzle game processing satisfies the offense condition includes determining whether the offense condition is satisfied based on points in accordance with the number of eliminated puzzle objects which represent the status of progress of the puzzle game processing for one of the plurality of users while the puzzle game processing is being performed.

10. The information processing system according to claim 8, wherein the information processing system is further caused to provide execution comprising quitting the puzzle game processing when the puzzle object arranged in the game field in the puzzle game processing crosses one line within the game field.

11. An information processing apparatus configured to perform puzzle game processing for a puzzle game played against another communicatively provided information processing apparatus, the information processing apparatus comprising:
a memory; and
processing circuitry including at least one processor, the processing circuitry configured to:
designate a game element with which a first parameter and a plurality of second parameters are associated;
perform the puzzle game processing based on an operation by a user onto a puzzle object arranged in a game field; and
output, when a status of progress of the puzzle game processing satisfies an offense condition while the puzzle game processing is being performed, the first parameter to the another information processing apparatus for executing an offense event that produces an effect of interference with progress of the puzzle game processing in the game field in the puzzle game processing for an opponent, wherein
during execution of the offense event, when the offense event is accepted from the another information processing apparatus while the puzzle game processing is being performed, a degree of interference with progress being determined based on the first parameter from the another information processing apparatus in the game field in the puzzle game processing, during execution of the offense event, the determined degree of interference being lessened based on the second parameter associated with the designated game element, and
executing the offense event includes lessening the determined degree of interference based on the second parameter corresponding to the first parameter among the plurality of second parameters associated with the game element designated for the opponent.

12. A method of controlling an information processing system that is configured to perform puzzle game processing for a puzzle game played against each other by a plurality of users, the method comprising:
designating a game element with which a first parameter and a plurality of second parameters are associated for each of the plurality of users;
performing the puzzle game processing based on an operation by each of the plurality of users onto a puzzle object arranged in a game field;
executing, when a status of progress of the puzzle game processing for one user of the plurality of users satisfies an offense condition while the puzzle game processing is being performed, an offense event that produces an effect of interference with progress of the puzzle game processing in a game field in the puzzle game processing for an opponent of the one user of the plurality of users;
determining a degree of interference based on the first parameter associated with the game element designated for the one user; and
lessening the determined degree of interference based on a second parameter associated with the game element designated for the opponent, wherein
executing the offense event includes lessening the determined degree of interference based on the second parameter corresponding to the first parameter among the plurality of second parameters associated with the game element designated for the opponent.

13. A non-transitory storage medium that stores an information processing program readable by a computer of an information processing apparatus configured to perform puzzle game processing for a puzzle game played against another communicatively provided information processing apparatus, the information processing program causing the computer to perform processing comprising:
designating a game element with which first and second parameters are associated;
performing the puzzle game processing based on an operation by a user onto a puzzle object arranged in a game field;
outputting, when a status of progress of the puzzle game processing satisfies an offense condition while the puzzle game processing is being performed, the first parameter to the another information processing apparatus for executing an offense event that produces an effect of interference with progress of the puzzle game processing in a game field in the puzzle game processing for an opponent;
during execution of the offense event, determining, when the offense event is accepted from the another information processing apparatus while the puzzle game processing is being performed, a degree of interference with progress based on the first parameter from the another information processing apparatus in the game field in the puzzle game processing; and during execution of the offense event, lessening the determined degree of interference based on the second parameter associated with the designated game element.

14. An information processing system configured to perform puzzle game processing for a puzzle game played against each other by a plurality of users, the information processing system comprising:
   a processor; and
   a memory configured to store computer readable instructions that, when executed by the processor, cause the information processing system to provide execution comprising:
      designating a game element with which first and second parameters are associated for each of the plurality of users;
      performing the puzzle game processing based on an operation by each of the plurality of users onto a puzzle object arranged in a game field; and
      executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
   during execution of the offense event, a degree of interference being determined based on a first parameter associated with the game element designated for the one user,
   during execution of the offense event, the determined degree of interference being lessened based on a second parameter associated with the game element designated for the opponent, and
   the second parameter includes a probability with which interference with progress of the puzzle game processing is lessened.

15. An information processing system configured to perform puzzle game processing for a puzzle game played against each other by a plurality of users, the information processing system comprising:
   a processor; and
   a memory configured to store computer readable instructions that, when executed by the processor, cause the information processing system to provide execution comprising:
      designating a game element with which first and second parameters are associated for each of the plurality of users;
      performing the puzzle game processing based on an operation by each of the plurality of users onto a puzzle object arranged in a game field; and
      executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
   during execution of the offense event, a degree of interference being determined based on a first parameter associated with the game element designated for the one user,
   during execution of the offense event, the determined degree of interference being lessened based on a second parameter associated with the game element designated for the opponent,
   one set of specific first and second parameters is set for each of a plurality of game elements, and
   a combination pattern of the first and second parameters associated with each game element among the plurality of game elements is different for each game element.

16. An information processing system configured to perform puzzle game processing for a puzzle game played against each other by a plurality of users, the information processing system comprising:
   a processor; and
   a memory configured to store computer readable instructions that, when executed by the processor, cause the information processing system to provide execution comprising:
      designating a game element with which first and second parameters are associated for each of the plurality of users;
      performing the puzzle game processing based on an operation by each of the plurality of users onto a puzzle object arranged in a game field; and
      executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
   during execution of the offense event, a degree of interference being determined based on a first parameter associated with the game element designated for the one user,
   during execution of the offense event, the determined degree of interference being lessened based on a second parameter associated with the game element designated for the opponent,
   whether the status of progress of the puzzle game processing satisfies the offense condition is determined, and
   the offense condition is different depending on the first parameter associated with the game element.

17. An information processing system configured to perform puzzle game processing for a puzzle game played against each other by a plurality of users, the information processing system comprising:
   a processor; and
   a memory configured to store computer readable instructions that, when executed by the processor, cause the information processing system to provide execution comprising:
      designating a game element with which first and second parameters are associated for each of the plurality of users;
      performing the puzzle game processing based on an operation by each of the plurality of users onto a puzzle object arranged in a game field; and
      executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, performing the puzzle game processing includes performing the puzzle game processing for eliminating a puzzle object arranged in the game field, based on an operation by each user onto the puzzle object, and executing the offense event includes determining the number of puzzle objects to additionally be arranged in the game field in the puzzle game processing for the opponent, based on the first parameter associated with the game element designated for the one user.

18. The information processing system according to claim 16, wherein
the offense condition is set to be satisfied more readily or less readily as the first parameter is larger.

19. The information processing system according to claim 17, wherein the information processing system is further caused to provide execution comprising determining whether the status of progress of the puzzle game processing satisfies the offense condition, wherein
determining whether the status of progress of the puzzle game processing satisfies the offense condition includes determining whether the offense condition is satisfied based on points in accordance with the number of eliminated puzzle objects which represent the status of progress of the puzzle game processing for one of the plurality of users while the puzzle game processing is being performed.

20. The information processing system according to claim 17, wherein the information processing system is further caused to provide execution comprising quitting the puzzle game processing when the puzzle object arranged in the game field in the puzzle game processing crosses one line within the game field.

21. An information processing apparatus configured to perform puzzle game processing for a puzzle game played against another communicatively provided information processing apparatus, the information processing apparatus comprising:
a memory; and
processing circuitry including at least one processor, the processing circuitry configured to:
designate a game element with which first and second parameters are associated for each of the plurality of users;
perform the puzzle game processing based on an operation by each of the plurality of users onto a puzzle object arranged in a game field; and
execute, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, and the second parameter includes a probability with which interference with progress of the puzzle game processing is lessened.

22. An information processing apparatus configured to perform puzzle game processing for a puzzle game played against another communicatively provided information processing apparatus, the information processing apparatus comprising:
a memory; and
processing circuitry including at least one processor, the processing circuitry configured to:
designate a game element with which first and second parameters are associated for each of the plurality of users;
perform the puzzle game processing based on an operation by each of the plurality of users onto a puzzle object arranged in a game field; and
execute, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, one set of specific first and second parameters is set for each of a plurality of game elements, and a combination pattern of the first and second parameters associated with each game element among the plurality of game elements is different for each game element.

23. An information processing apparatus configured to perform puzzle game processing for a puzzle game played against another communicatively provided information processing apparatus, the information processing apparatus comprising:
a memory; and
processing circuitry including at least one processor, the processing circuitry configured to:
designate a game element with which first and second parameters are associated for each of the plurality of users;
perform the puzzle game processing based on an operation by each of the plurality of users onto a puzzle object arranged in a game field; and
execute, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, whether the status of progress of the puzzle game processing satisfies the offense condition is determined, and the offense condition is different depending on the first parameter associated with the game element.

24. An information processing apparatus configured to perform puzzle game processing for a puzzle game played against another communicatively provided information processing apparatus, the information processing apparatus comprising:

a memory; and processing circuitry including at least one processor, the processing circuitry configured to:

designate a game element with which first and second parameters are associated for each of the plurality of users;

perform the puzzle game processing based on an operation by each of the plurality of users onto a puzzle object arranged in a game field; and execute, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, performing the puzzle game processing includes performing the puzzle game processing for eliminating a puzzle object arranged in the game field, based on an operation by each user onto the puzzle object, and executing the offense event includes determining the number of puzzle objects to additionally be arranged in the game field in the puzzle game processing for the opponent, based on the first parameter associated with the game element designated for the one user.

25. A method of controlling an information processing system that is configured to perform puzzle game processing for a puzzle game played against each other by a plurality of users, the method comprising:

designating a game element with which first and second parameters are associated for each of the plurality of users;

performing the puzzle game processing based on an operation by each of the plurality of users onto a puzzle object arranged in a game field; and executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, and the second parameter includes a probability with which interference with progress of the puzzle game processing is lessened.

26. A method of controlling an information processing system that is configured to perform puzzle game processing for a puzzle game played against each other by a plurality of users, the method comprising:

designating a game element with which first and second parameters are associated for each of the plurality of users;

performing the puzzle game processing based on an operation by each of the plurality of users onto a puzzle object arranged in a game field; and executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, one set of specific first and second parameters is set for each of a plurality of game elements, and a combination pattern of the first and second parameters associated with each game element among the plurality of game elements is different for each game element.

27. A method of controlling an information processing system that is configured to perform puzzle game processing for a puzzle game played against each other by a plurality of users, the method comprising:

designating a game element with which first and second parameters are associated for each of the plurality of users;

performing the puzzle game processing based on an operation by each of the plurality of users onto a puzzle object arranged in a game field; and executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user,
during execution of the offense event, the determined degree of interference being lessened based on a second parameter associated with the game element designated for the opponent,
whether the status of progress of the puzzle game processing satisfies the offense condition is determined, and
the offense condition is different depending on the first parameter associated with the game element.

28. A method of controlling an information processing system that is configured to perform puzzle game processing for a puzzle game played against each other by a plurality of users, the method comprising:
designating a game element with which first and second parameters are associated for each of the plurality of users;
performing the puzzle game processing based on an operation by each of the plurality of users onto a puzzle object arranged in a game field; and
executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
during execution of the offense event, a degree of interference being determined based on a first parameter associated with the game element designated for the one user,
during execution of the offense event, the determined degree of interference being lessened based on a second parameter associated with the game element designated for the opponent,
performing the puzzle game processing includes performing the puzzle game processing for eliminating a puzzle object arranged in the game field, based on an operation by each user onto the puzzle object, and
executing the offense event includes determining the number of puzzle objects to additionally be arranged in the game field in the puzzle game processing for the opponent, based on the first parameter associated with the game element designated for the one user.

29. A non-transitory storage medium that stores an information processing program readable by a computer of an information processing apparatus configured to perform puzzle game processing for a puzzle game played against another communicatively provided information processing apparatus, the information processing program causing the computer to perform processing comprising:
designating a game element with which first and second parameters are associated for each of the plurality of users;
performing the puzzle game processing based on an operation by each of the plurality of users onto a puzzle object arranged in a game field; and
executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
during execution of the offense event, a degree of interference being determined based on a first parameter associated with the game element designated for the one user,
during execution of the offense event, the determined degree of interference being lessened based on a second parameter associated with the game element designated for the opponent, and
the second parameter includes a probability with which interference with progress of the puzzle game processing is lessened.

30. A non-transitory storage medium that stores an information processing program readable by a computer of an information processing apparatus configured to perform puzzle game processing for a puzzle game played against another communicatively provided information processing apparatus, the information processing program causing the computer to perform processing comprising:
designating a game element with which first and second parameters are associated for each of the plurality of users;
performing the puzzle game processing based on an operation by each of the plurality of users onto a puzzle object arranged in a game field; and
executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein
during execution of the offense event, a degree of interference being determined based on a first parameter associated with the game element designated for the one user,
during execution of the offense event, the determined degree of interference being lessened based on a second parameter associated with the game element designated for the opponent,
one set of specific first and second parameters is set for each of a plurality of game elements, and
a combination pattern of the first and second parameters associated with each game element among the plurality of game elements is different for each game element.

31. A non-transitory storage medium that stores an information processing program readable by a computer of an information processing apparatus configured to perform puzzle game processing for a puzzle game played against another communicatively provided information processing apparatus, the information processing program causing the computer to perform processing comprising:
designating a game element with which first and second parameters are associated for each of the plurality of users;
performing the puzzle game processing based on an operation by each of the plurality of users onto a puzzle object arranged in a game field; and
executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, whether the status of progress of the puzzle game processing satisfies the offense condition is determined, and the offense condition is different depending on the first parameter associated with the game element.

32. A non-transitory storage medium that stores an information processing program readable by a computer of an information processing apparatus configured to perform puzzle game processing for a puzzle game played against another communicatively provided information processing apparatus, the information processing program causing the computer to perform processing comprising:

designating a game element with which first and second parameters are associated for each of the plurality of users;

performing the puzzle game processing based on an operation by each of the plurality of users onto a puzzle object arranged in a game field; and executing, when a status of progress of the puzzle game processing for one user of the plurality of users satisfies an offense condition while the puzzle game processing is being performed, an offense event that produces an effect of interference with progress of the puzzle game processing in the game field in the puzzle game processing for an opponent of the one user of the plurality of users, wherein during execution of the offense event, a degree of interference being determined based on a first parameter associated with the game element designated for the one user, during execution of the offense event, the determined degree of interference being lessened based on a second parameter associated with the game element designated for the opponent, performing the puzzle game processing includes performing the puzzle game processing for eliminating a puzzle object arranged in the game field, based on an operation by each user onto the puzzle object, and executing the offense event includes determining the number of puzzle objects to additionally be arranged in the game field in the puzzle game processing for the opponent, based on the first parameter associated with the game element designated for the one user.

* * * * *